United States Patent
Emadi et al.

(10) Patent No.: US 9,825,470 B2
(45) Date of Patent: Nov. 21, 2017

(54) MULTI-SOURCE POWER CONVERTER

(71) Applicant: McMaster University, Hamilton (CA)

(72) Inventors: Ali Emadi, Burlington (CA); Pierre Magne, Hamilton (CA)

(73) Assignee: McMaster University, Hamilton (CA)

( * ) Notice: Subject to any disclaimer, the term of this patent is extended or adjusted under 35 U.S.C. 154(b) by 932 days.

(21) Appl. No.: 14/062,979

(22) Filed: Oct. 25, 2013

(65) Prior Publication Data

US 2014/0117770 A1 May 1, 2014

Related U.S. Application Data

(60) Provisional application No. 61/718,456, filed on Oct. 25, 2012.

(51) Int. Cl.
*H02J 5/00* (2016.01)
*H02M 7/49* (2007.01)

(52) U.S. Cl.
CPC ............. *H02J 5/00* (2013.01); *H02M 7/49* (2013.01); *Y10T 307/707* (2015.04)

(58) Field of Classification Search
CPC .......... H02J 5/00; H02M 7/49; Y10T 307/707
USPC ....................................................... 307/151
See application file for complete search history.

(56) References Cited

U.S. PATENT DOCUMENTS

| 6,894,461 | B1 * | 5/2005 | Hack | G05F 1/70 307/82 |
| 7,929,327 | B2 * | 4/2011 | Haines | H02J 9/062 363/106 |
| 2008/0179951 | A1 * | 7/2008 | Brune | H02M 5/4585 307/31 |
| 2008/0218104 | A1 * | 9/2008 | Lukic | B60L 11/005 318/139 |

(Continued)

FOREIGN PATENT DOCUMENTS

CA 2831252 A1 * 4/2014 ............. H02M 7/49

*Primary Examiner* — Jared Fureman
*Assistant Examiner* — Michael Warmflash
(74) *Attorney, Agent, or Firm* — Bereskin & Parr LLP/S.E.N.C.R.L., s.r.l.

(57) ABSTRACT

A multi-source power converter is proposed to permit bidirectional DC to AC conversion from n (n≥2 and n∈ℕ) DC voltage sources to an AC load with a reduced number of switches, and DC to DC conversion. Both single and three phases AC load are considered. The proposed topology consists in a single stage of conversion, and therefore a high efficiency can be expected for the system. Any type of DC sources can be used in the system (fuel-cell, battery, ultra-capacitor, photo-voltaic cells, DC bus, DC to DC or AC to DC converter, etc.). The AC load can be either single or three phases (single-phase AC grid/microgrid, three-phase electric machines, induction machine, synchronous machine, etc.). There is no requirement for the n DC voltage source values; they can be equal or different and they can be used individually or together by the converter to generate the AC output. If different DC voltage values are used, the converter (Continued)

can be controlled to generate a multi-level AC voltage. This permits to improve system's voltage and current power quality and to reduce electro-magnetic interferences (EMI). Therefore gains on both differential and EMI filters design can be expected.

18 Claims, 43 Drawing Sheets

(56) References Cited

U.S. PATENT DOCUMENTS

| | | | | |
|---|---|---|---|---|
| 2011/0084648 A1* | 4/2011 | Cao | ............... | H01M 10/44 320/103 |
| 2011/0128763 A1* | 6/2011 | Iwata | ............... | H02J 7/35 363/98 |
| 2011/0278938 A1* | 11/2011 | McCleer | ............... | H02J 7/0065 307/82 |
| 2014/0265588 A1* | 9/2014 | McCleer | ............... | H02M 7/53871 307/52 |

* cited by examiner

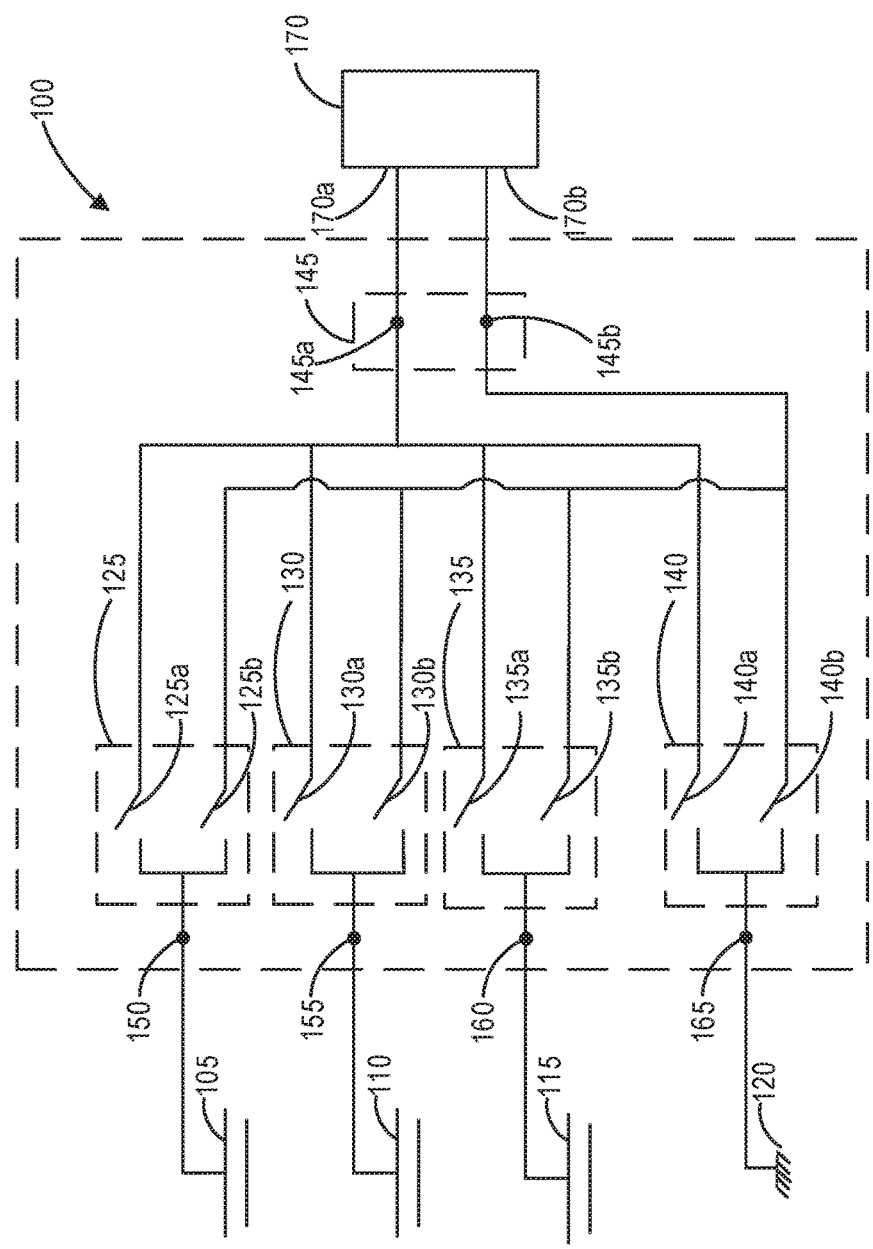

FIG. 10N

| Bidirectional Switch Positions | | | | | | | | | Line-to-Line Signals | Power Output | |
|---|---|---|---|---|---|---|---|---|---|---|---|
| 1020a | 1020b | 1020c | 1025a | 1025b | 1025c | 1030a | 1030b | 1030c | $V_{ab}$ | $V_{bc}$ | $V_{ca}$ |
| Closed | Closed | Open | Open | Open | Open | Open | Open | Closed | 0 | 1005 | -1005 |
| Closed | Open | Closed | Open | Open | Open | Open | Closed | Open | 1005 | -1005 | 0 |
| Open | Closed | Closed | Open | Open | Open | Closed | Open | Open | -1005 | 0 | 1005 |
| Open | Open | Closed | Open | Open | Open | Closed | Closed | Open | 0 | -1005 | 1005 |
| Open | Closed | Open | Open | Open | Open | Closed | Open | Closed | -1005 | 1005 | 0 |
| Closed | Open | Open | Open | Open | Open | Open | Closed | Closed | 1005 | 0 | -1005 |
| Closed | Closed | Closed | Open | Open | Open | Open | Open | Open | 0 | 0 | 0 |

FIG. 10O

| Bidirectional Switch Positions | | | | | | | | | Line-to-Line Signals | Power Output | |
|---|---|---|---|---|---|---|---|---|---|---|---|
| 1020a | 1020b | 1020c | 1025a | 1025b | 1025c | 1030a | 1030b | 1030c | $V_{ab}$ | $V_{bc}$ | $V_{ca}$ |
| Open | Open | Open | Closed | Closed | Open | Open | Open | Closed | 0 | 1010 | -1010 |
| Open | Open | Open | Closed | Open | Closed | Open | Closed | Open | 1010 | -1010 | 0 |
| Open | Open | Open | Open | Closed | Closed | Closed | Open | Open | -1010 | 0 | 1010 |
| Open | Open | Open | Open | Open | Closed | Closed | Closed | Open | 0 | -1010 | 1010 |
| Open | Open | Open | Open | Closed | Open | Closed | Open | Closed | -1010 | 1010 | 0 |
| Open | Open | Open | Closed | Open | Open | Open | Closed | Closed | 1010 | 0 | -1010 |
| Open | Open | Open | Closed | Closed | Closed | Open | Open | Open | 0 | 0 | 0 |

| | Bidirectional Switch Positions | | | | | | | | | Line-to-Line Signals | | Power Output |
|---|---|---|---|---|---|---|---|---|---|---|---|---|
| | 1020a | 1020b | 1020c | 1025a | 1025b | 1025c | 1030a | 1030b | 1030c | Vab | Vbc | Vca |
| | Closed | Open | Open | Open | Closed | Open | Open | Open | Closed | (1005-1010) | 1010 | -1005 |
| | Open | Closed | Open | Closed | Open | Open | Open | Open | Closed | (1010-1005) | 1005 | 1010 |
| | Open | Closed | Open | Open | Open | Closed | Closed | Open | Open | -1005 | (1005-1010) | 1010 |
| | Open | Open | Closed | Closed | Open | Open | Closed | Open | Open | -1010 | (1010-1005) | -1005 |
| | Open | Open | Closed | Open | Closed | Open | Open | Closed | Open | 1010 | -1005 | (1005-1010) |
| | Closed | Open | Open | Open | Closed | Open | Open | Closed | Open | 1005 | -1010 | (1010-1005) |
| | Closed | Open | Open | Open | Open | Closed | Open | Open | Open | (1005-1010) | 0 | (1010-1005) |
| | Open | Closed | Open | Closed | Open | Open | Open | Open | Open | (1010-1005) | 0 | (1005-1010) |
| | Open | Closed | Open | Open | Closed | Open | Open | Open | Open | (1005-1010) | (1010-1005) | 0 |
| | Closed | Open | Open | Open | Open | Closed | Open | Open | Open | (1010-1005) | (1005-1010) | 0 |
| | Open | Open | Closed | Closed | Open | Open | Open | Open | Open | 0 | (1010-1005) | (1005-1010) |
| | Open | Open | Closed | Open | Closed | Open | Open | Open | Open | 0 | (1005-1010) | (1010-1005) |
| | Closed | Closed | Open | Open | Open | Closed | Open | Open | Open | | | |

FIG 10P

| | | | | Bidirectional Switch Positions | | | | | |
|---|---|---|---|---|---|---|---|---|---|
| 1220a | 1220b | 1220c | 1225a | 1225b | 1225c | 1230a | 1230b | 1230c |
| Not Active | Not Active | Active | Closed | Open | Open | Not Active | Not Active | Active |
| Not Active | Not Active | Active | Open | Closed | Open | Not Active | Not Active | Active |
| Not Active | Active | Not Active | Closed | Open | Open | Not Active | Active | Not Active |
| Not Active | Active | Not Active | Open | Open | Closed | Not Active | Active | Not Active |
| Not Active | Not Active | Active | Closed | Open | Open | Not Active | Not Active | Active |
| Not Active | Not Active | Active | Closed | Open | Open | Not Active | Not Active | Active |

FIG. 12B

MULTI-SOURCE POWER CONVERTER

CROSS-REFERENCE TO PRIOR APPLICATIONS

This application claims the benefit of U.S. Provisional Patent Application No. 61/718,456 filed on Oct. 25, 2012, which is incorporated herein in its entirety by reference.

FIELD

The embodiments disclosed herein related to power converters. More particularly, the disclosed embodiments relate to switched power converters.

BACKGROUND

Increased costs relating to fossil fuel consumption, including energy, environmental and other costs, have resulted in significant consumer, industrial and government demand for more efficient and less fossil fuel-dependent systems. Significant research and development resources are presently directed towards power sources and electric energy storage devices, such as batteries, ultra-capacitors, solar panels, fuel-cells, etc. Each of these devices typically supplies a DC power signal at a particular voltage level, which must be converted to other DC levels for use with some devices, or inverted into an AC signal to couple to an AC power grid or to supply a power signal to an AC electric motor.

Similarly, it can be desirable to convert a single or three phase AC power signal into a DC power signal, for example, to allow the electric energy in the signal to be stored or transmitted to another DC electrical system.

Existing switching devices typically contain a relatively high number of switches and other components, making them inefficient due to increased power loss, heat dissipation, and production costs. For example, some tie-grid inverters that are used to couple a DC power signal to an AC power grid employ isolating transformers as well as a multistage conversion process, which converts DC power to high frequency AC, back to DC, then to a final AC output voltage. Multi-stage converters typically require an energy storage element to decouple converter inputs and outputs. In electrified traction systems, the use of different DC sources operating at different voltage levels requires the use of DC to DC converters to adjust voltage levels.

There is a need for more efficient power converters.

SUMMARY

In a first aspect, some embodiments of the invention provide a power converter comprising a plurality of DC terminals, a plurality of converter cells, and an AC terminal.

In another aspect, some embodiments of the invention provide a power converter that coverts power from a plurality of independent DC voltage sources and provides a power output signal to an AC terminal.

In another aspect, some embodiments of the invention provide a power converter that converts power from an AC source and provides a power output signal to a plurality of independent DC voltage loads.

In some embodiments, the converter cells comprises bidirectional switches.

In some embodiments, the converter cells each comprise two bidirectional switches per cell.

In some embodiments, the converter cells each comprise three bidirectional switches per cell.

In some embodiments, the plurality of converter cells are each coupled between a plurality of DC terminals and an AC terminal.

In some embodiments, one converter cell is coupled between ground and an AC terminal.

In some embodiments, the AC load is a single phase load.

In some embodiments, the AC source is a single phase source.

In some embodiments, the AC source is a three phase source.

In some embodiments, the AC load is a three phase load.

In some embodiments, a plurality of independent DC voltage sources coupled to the corresponding DC terminals are of equal voltage magnitude.

In some embodiments, a plurality of independent DC voltage sources coupled to the corresponding DC terminals are of different voltage magnitude.

In some embodiments, the voltage provided at the AC terminals is a multi-level voltage.

In some embodiments, only a selection of the bidirectional switches of the plurality of converter cells are conducting power to the AC terminals.

In some embodiments, only a selection of the bidirectional switches of the plurality of converter cells are conducting power to the DC terminals.

In some embodiments, a backup DC switch is coupled between an independent backup DC voltage source and a corresponding DC terminal to permit fault tolerant operation.

In some embodiments, the backup DC switch comprises a bidirectional switch.

In some embodiments, the power converter converts power from an AC source to an independent backup DC voltage source.

In some embodiments, the switching states of the bidirectional switches in the converter cells are controlled by a computing platform.

In some embodiments, at least one DC to DC converter is coupled between at least two independent DC voltage sources.

In some embodiments, the power converter is used to convert power from at least one independent DC voltage source to at least one independent DC voltage source.

In some embodiments, the power converter supplies a DC power signal from a plurality of independent DC voltage sources to the AC terminals.

BRIEF DESCRIPTION OF THE DRAWINGS

Various embodiments of the invention will now be described, by way of example, with reference to the accompanying drawings, in which:

FIG. 1 illustrates a power converter according to an example embodiment;

FIG. 9F illustrates a power converter operating in a second mode according to a sixth example embodiment;

FIG. 10F illustrates a power converter operating in a third mode according to a sixth example embodiment;

FIG. 10N illustrates various switching states of bidirectional switches operating in a first mode according to an example embodiment;

FIG. 10O illustrates various switching states of bidirectional switches operating in a second mode according to an example embodiment;

FIG. 10P illustrates various switching states of bidirectional switches operating in a third mode according to an example embodiment;

FIG. 12B illustrates various switching states of bidirectional switches of a power converter operating as a DC to DC converter according to an example embodiment.

DESCRIPTION OF EXEMPLARY EMBODIMENTS

Figure 2A:
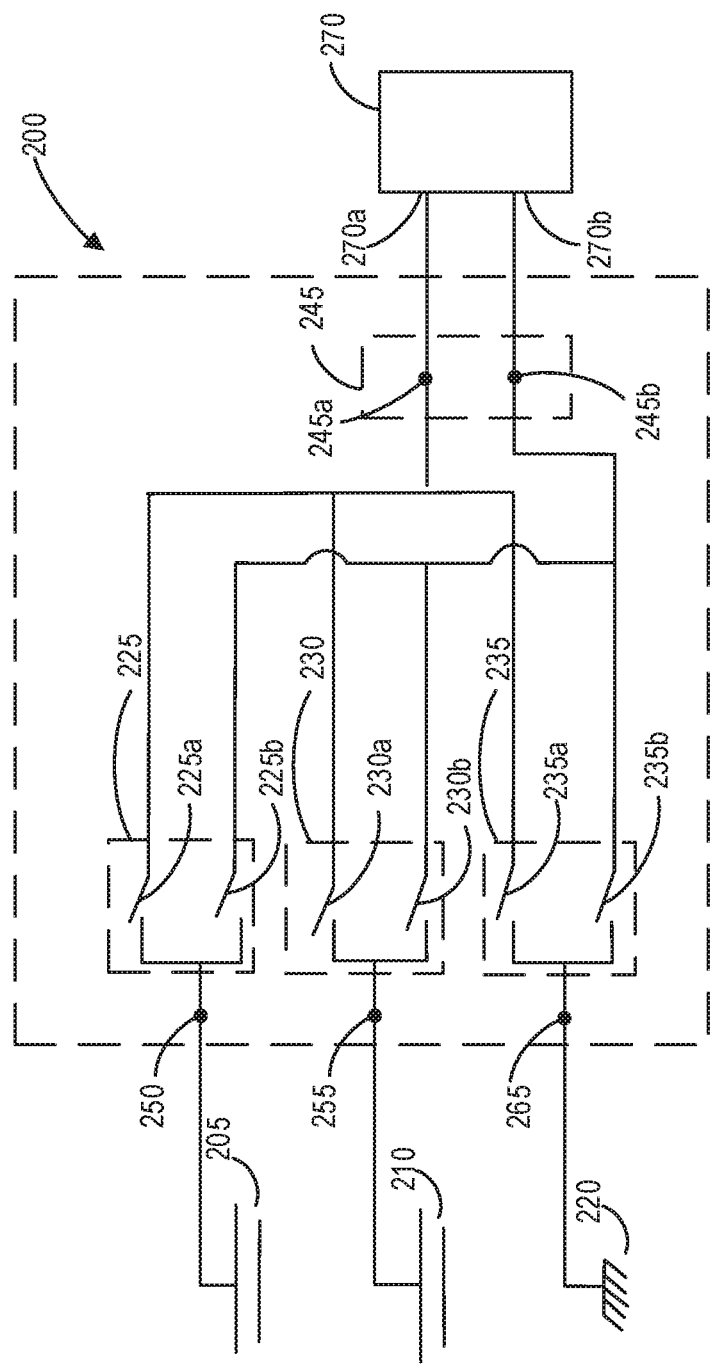
FIG. 2A illustrates a power converter according to another example embodiment.

Some of the following embodiments describe power converters that convert power between a plurality of independent DC voltage sources to a single phase or three phase AC load. Other embodiments describe power converters that convert power between a single phase or three phase AC source to a plurality of independent DC voltage loads. The DC voltage sources and DC voltage loads are independent, meaning that no series connections between them when the power converter is operating as an inverter or rectifier, respectively.

The independent DC voltage sources or loads can have the same magnitude, or they can be of different magnitudes. As an inverter, the power converter generates a controlled three-phase AC output. As a rectifier, the power converter can supply a plurality of independent DC voltage loads of different magnitudes. Independent DC voltage sources of different magnitudes can generate a multi-level power output signal at the AC terminals. Conversely, the power converter can convert power from an AC source to a plurality of independent DC voltage loads of different magnitudes.

Each additional independent DC voltage source added to the power converter described herein requires one additional converter cell. For example, a power converter with n independent DC voltage sources would require n+1 converter cells. The use of n independent DC voltage sources may provide $2^n-1$ different modes to generate a power output signal. For example, a power converter with two independent DC voltage sources can operate in three modes. In a first mode, the converter cells conduct power from only the first independent DC voltage source. In a second mode, the converter cells conduct power from only the second independent DC voltage source. In a third mode, the converter cells successively conduct power from both the first and second independent DC voltage sources.

The power converter described in the following embodiments has several advantages, for example, it provides a single stage of power conversion with a reduced number of switches, which results in higher reliability, efficiency, and integration. Additionally, a multi-level power output signal, where power is converted in small voltage steps, produces higher power quality waveforms, reduces dv/dt stresses on the AC load and reduces electromagnetic interference issues.

Reference is first made to FIG. 1, which illustrates a power converter 100 operating as a power inverter for converting power from a plurality of independent DC voltage sources 105, 110, and 115, to a single phase AC load 170, according to an example embodiment. In this embodiment DC voltage source 105 represents a first independent DC voltage source, DC voltage source 110 represents a second independent DC voltage source, and DC voltage source 115 represents an $n^{th}$ independent DC voltage source.

Power converter 100 includes a plurality of DC terminals 150, 155, 160, and 165, wherein DC terminal 150 represents a first DC terminal coupled to the first independent DC source 105, DC terminal 155 represents a second DC terminal coupled to independent DC source 110, DC terminal 160 represents the $n^{th}$ DC terminal coupled to the $n^{th}$ independent DC source, and DC terminal 165 is coupled to ground 120.

A plurality of converter cells 125, 130, and 135 is coupled between a corresponding DC terminal, 150, 155, and 160 respectively, and AC terminal 145. One converter cell 140 is coupled between DC terminal 165 and AC terminal 145.

Each converter cell includes two bidirectional switches 125a, 125b, 130a, 130b, 135a, 135b, 140a, and 140b. The AC terminal 145 comprises two nodes, a positive node 145a and a negative node 145b, wherein switches 125a, 130a, 135a, and 140a are coupled to the positive node 145a, and switches 125b, 130b, 135b, and 140b are coupled to the negative node 145b. AC terminal nodes 145a and 145b are coupled to a single phase AC load 170. AC load 170 comprises a positive node 170a, and a negative node 170b.

The switching state of each bidirectional switch in the converter cells is controlled by a controller (not shown), which may include a digital signal processor board, microcontroller, or field programmable gate array.

Power converter 100 has various applications, for example, for converting power between independent DC voltage sources including photovoltaic cells or wind turbines and an AC utility grid, or for converting power between an integrated battery management system or uninterrupted power supply and an AC utility grid, as well as for converting power between a hybrid energy storage device and DC micro grid. It can also be used in an electrified traction system, for example, in an aircraft or vehicle.

Reference is next made to FIG. 2A, which illustrates an example embodiment of power converter 200 operating as an inverter for converting power from two independent DC voltage sources 205 and 210, to a single phase AC load 270. Power converter 200 comprises three DC terminals 250, 255, and 265, three converter cells 225, 230, and 235, and AC terminal 245. DC terminals 250 and 255 are coupled to independent DC voltage sources 205 and 210, respectively, and DC terminal 265 is coupled to ground 220.

AC terminal 245 is coupled to single phase AC load 270. AC terminal 245 comprises two AC terminal nodes 245a and 245b. AC load 270 comprises a positive node 270a, and a negative node 270b. AC terminal node 245a is coupled to the positive node 270a of single phase AC load 270, and AC terminal node 245b is coupled to the negative node 270b of single phase AC load 270.

Converter cells 225, 230, and 235, each comprise two bidirectional switches 225a, 225b, 230a, 230b, 235a, and 235b, and each converter cell is coupled between a corresponding DC terminal, 250, 255, 265, and the AC terminal 245. Specifically bidirectional switches 225a, 230a, and 235a are coupled to AC terminal node 245a, and bidirectional switches 225b, 230b, and 235b are coupled to AC terminal node 245b.

The switching states of each bidirectional switch in converter cells 225, 230, and 235, are controlled by an embedded computing platform (not shown), which may include a digital signal processor board, microcontroller, or field programmable gate array.

The power converter of FIG. 2A can operate in three modes. For example, in a first mode converter cells are only conducting power from independent DC voltage source 205, in a second mode converter cells are only conducting power from independent DC voltage source 210, and in a third mode converter cells are successively conducting power from both independent DC voltage sources 205 and 210.

Figures 2B, 2C:
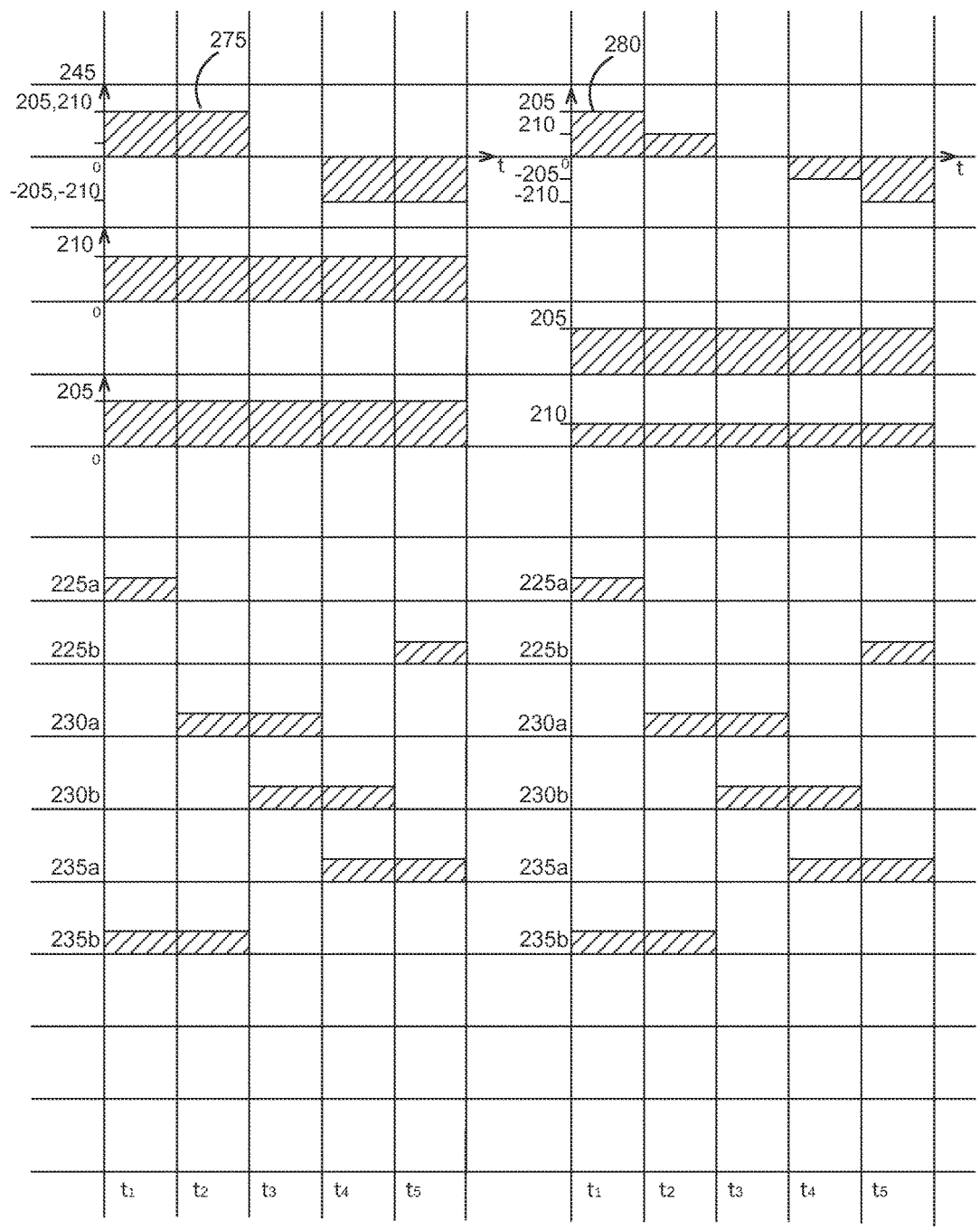
FIG. 2B illustrates an example embodiment waveform of a power output signal.
FIG. 2C illustrates a second example embodiment waveform of a power output signal.

Now referring to FIG. 2B, which illustrates power output signal 275 at AC terminal 245 for power converter 200 operating in a third mode across 5 time intervals $t_1$ to $t_5$. Independent DC voltage sources 205 and 210 are of equal magnitude and power output signal 275 is a multi-level voltage.

During $t_1$, bidirectional switch 225a is closed and 225b is open, bidirectional switches 230a and 230b are open, bidirectional switch 235a is open and 235b is closed, and the power output signal at AC terminal 245 is equal to the voltage magnitude of independent DC source 205.

During $t_2$, bidirectional switches 225a and 225b are open, bidirectional switch 230a is closed and 230b is open, bidirectional switch 235a is open and 235b is closed, and the power output signal at AC terminal 245 is equal to the voltage magnitude of independent DC source 210.

During $t_3$, bidirectional switches 225a and 225b are open, bidirectional switches 230a and 230b are closed, bidirectional switches 235a and 235b are open, and the power output signal at AC terminal 245 is equal to zero.

During $t_4$, bidirectional switches 225a and 225b are open, bidirectional switch 230a is open and 230b is closed, bidirectional switch 235a is closed and 235b is open, and the power output signal at AC terminal 245 is equal to the voltage magnitude of independent DC voltage source 210, but of negative polarity.

During $t_5$, bidirectional switch 225a is open and 225b is closed, bidirectional switches 230a and 230b are open, bidirectional switch 235a is closed and 235b is open, and the power output signal at AC terminal 245 is equal to the voltage magnitude of independent DC voltage source 205, but of negative polarity.

Now referring to FIG. 2C, which illustrates power output signal 280 at AC terminal 245 for power converter 200 operating in a third mode across 5 time intervals $t_1$ to $t_5$. Independent DC voltage source 205 is greater in magnitude than 210, and power output signal 280 is a multi-level voltage.

During $t_1$, bidirectional switch 225a is closed and 225b is open, bidirectional switches 230a and 230b are open, bidirectional switch 235a is open and 235b is closed, and the power output signal at AC terminal 245 is equal to the voltage magnitude of independent DC voltage source 205.

During $t_2$, bidirectional switches 225a and 225b are open, bidirectional switch 230a is closed and 230b is open, bidirectional switch 235a is open and 235b is closed, and the power output signal at AC terminal 245 is equal to the voltage magnitude of independent DC voltage source 210.

During $t_3$, bidirectional switches 225a and 225b are open, bidirectional switches 230a and 230b are closed, bidirectional switches 235a and 235b are open, and the power output signal at AC terminal 245 is equal to zero.

During $t_4$, bidirectional switches 225a and 225b are open, bidirectional switch 230a is open and 230b is closed, bidirectional switch 235a is closed and 235b is open, and the power output signal at AC terminal 245 is equal to the voltage magnitude of independent DC voltage source 210, but of negative polarity.

During $t_5$, bidirectional switch 225a is open and 225b is closed, bidirectional switches 230a and 230b are open, bidirectional switch 235a is closed and 235b is open, and the power output signal at AC terminal 245 is equal to the voltage magnitude of independent DC voltage source 205, but of negative polarity.

Figure 2D:
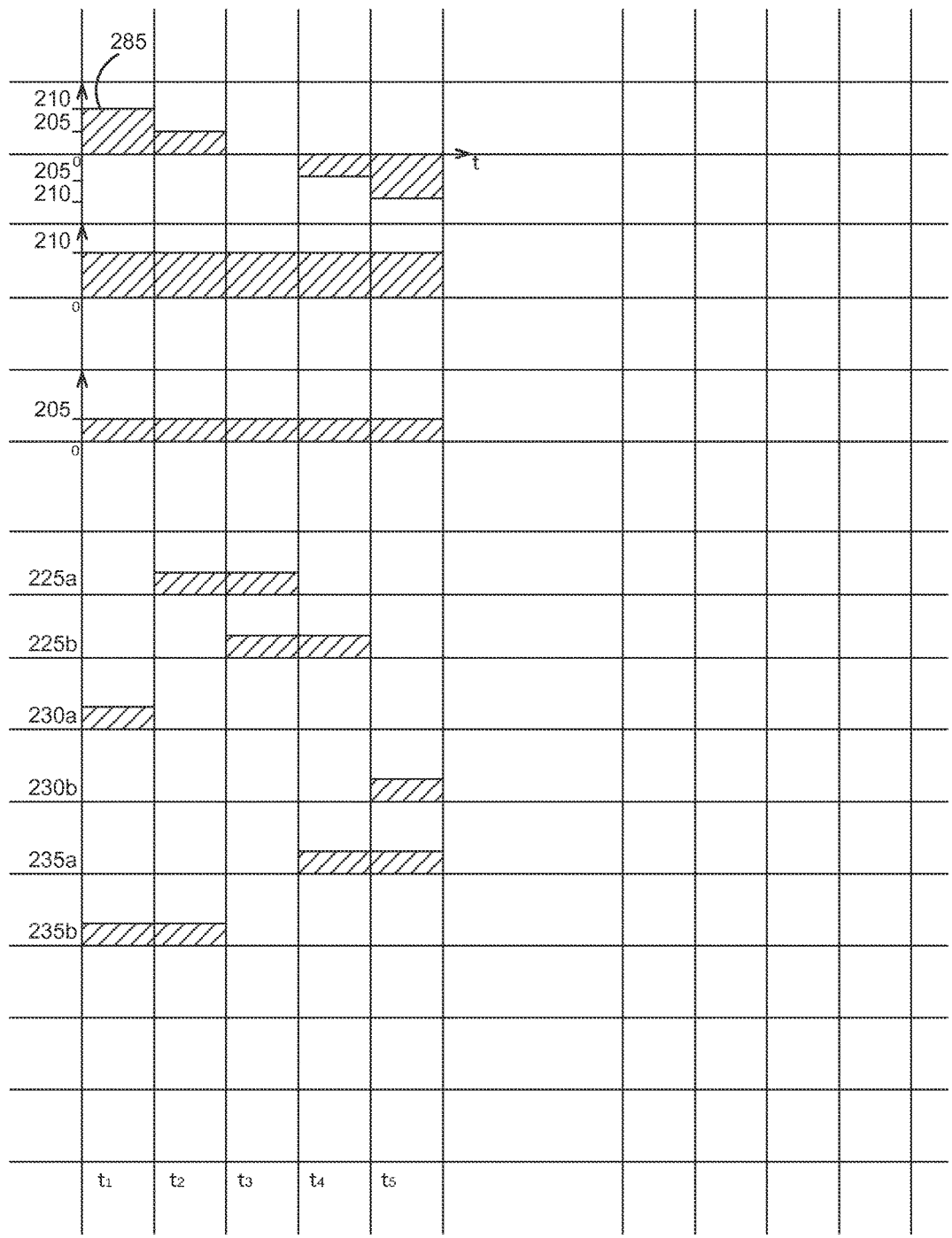
FIG. 2D illustrates a third example embodiment waveform of a power output signal.

Now referring to FIG. 2D, which illustrates power output signal 285 at AC terminal 245 for power converter 200 operating in a third mode across 5 time intervals $t_1$ to $t_5$. Independent DC voltage source 210 is greater in magnitude than 205, and power output signal 285 is a multi-level voltage.

During $t_1$, bidirectional switches 225a and 225b are open, bidirectional switch 230a is closed and bidirectional switch 230b is open, bidirectional switch 235a is open and bidirectional switch 235b is closed, the power output signal at AC terminal 245 is equal to the voltage magnitude of independent DC voltage source 210.

During $t_2$, bidirectional switch 225a is closed and 225b is open, bidirectional switches 230a and 230b are open, bidirectional switch 235a is open and 235b is closed, and the power output signal at AC terminal 245 is equal to the voltage magnitude of independent DC voltage source 205.

During $t_3$, bidirectional switches 225a and 225b are closed, bidirectional switches 230a, 230b, 235a, and 235b are open, and the power output signal at AC terminal 245 is equal to zero.

During $t_4$, bidirectional switch 225a is open and 225b is closed, bidirectional switches 230a and 230b are open, bidirectional switch 235a is closed and 235b is open, and the power output signal at AC terminal 245 is equal to the voltage magnitude of independent DC voltage source 205, but of negative polarity.

During $t_5$, bidirectional switches 225a and 225b are open, bidirectional switch 230a is open and 230b is closed, bidirectional switch 235a is closed and 235b is open, and the power output signal at AC terminal 245 is equal to the voltage magnitude of independent DC voltage source 210, but of negative polarity.

Figure 3:
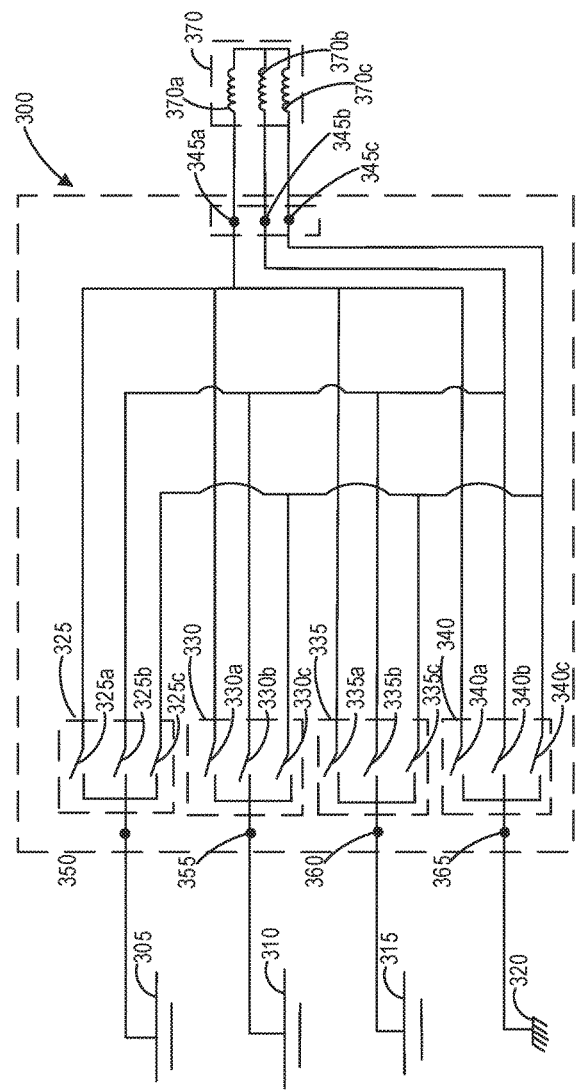
FIG. 3 illustrates a power converter according to another example embodiment.

Now referring to FIG. 3, which illustrates power converter 300 operating as an inverter for converting power from a plurality of independent DC voltage sources to a three phase AC load 370, according to an example embodiment. Power converter 300 comprises a plurality of DC terminals 350, 355, 360, and 365, a plurality of converter cells 325, 330, 335, and 340, and AC terminal 345.

DC terminals 350, 355, and 360 are each coupled to an independent DC voltage source 305, 310, and 315, respectively. DC source 305 represents a first independent DC voltage source, DC source 310 represents a second independent DC voltage source, and DC source 315 represents an $n^{th}$ independent DC voltage source. Each additional independent DC voltage source added to power converter 300 requires on additional converter cell. DC terminal 365 is coupled on ground 320.

AC terminal 345 is coupled to a three phase AC load 370. AC terminal 345 comprises three AC terminal nodes, 345a, 345b, and 345c. Each AC terminal node is coupled to a separate phase of AC load 370, where 370a represents phase A, 370b represents phase B, and 370c represents phase C of AC load 370.

Converter cells 325, 330, 335, are each coupled between a corresponding DC terminal 350, 355, and 360, respectively, and AC terminal 345. Converter cell 340 is coupled between DC terminal 365 and AC terminal 345. Each converter cell 325, 330, 335, and 340, comprises three bidirectional switches 325a, 325b, 325c, 330a, 330b, 330c, 335a, 335b, 335c, 340a, 340b, 340c, wherein bidirectional switches 325a, 330a, 335a, and 340a are coupled to AC terminal node 345a, bidirectional switches 325b, 330b, 335b, and 340b, are coupled to AC terminal node 345b, and bidirectional switches 325c, 330c, 335c, and 340c, are coupled to AC terminal node 345c.

The switching states of each bidirectional switch in converter cells 325, 330, 335, and 340 are controlled by an embedded computing platform (not shown), which may include a digital signal processor board, microcontroller, or field programmable gate array.

Power converter 300 has various applications, for example, hybrid electric or electric vehicles that employ DC sources to power a three phase motor. In an example embodiment, a first independent DC source may include a high power density source such as an ultra-capacitor and a second independent DC source may include a high energy density source battery. The independent DC source may comprise, for example, a rectified AC voltage generated by an AC electric machine operating as a generator. The AC load may include a three phase electric motor (e.g. synchronous or induction).

Although power converter 300 in FIG. 3 illustrates inverter mode of operation, a rectifier mode of operation can be inferred. Using the above example embodiment, a three phase electric motor may supply power to the plurality of independent DC sources through power converter 300 during regenerative braking.

Figure 4:
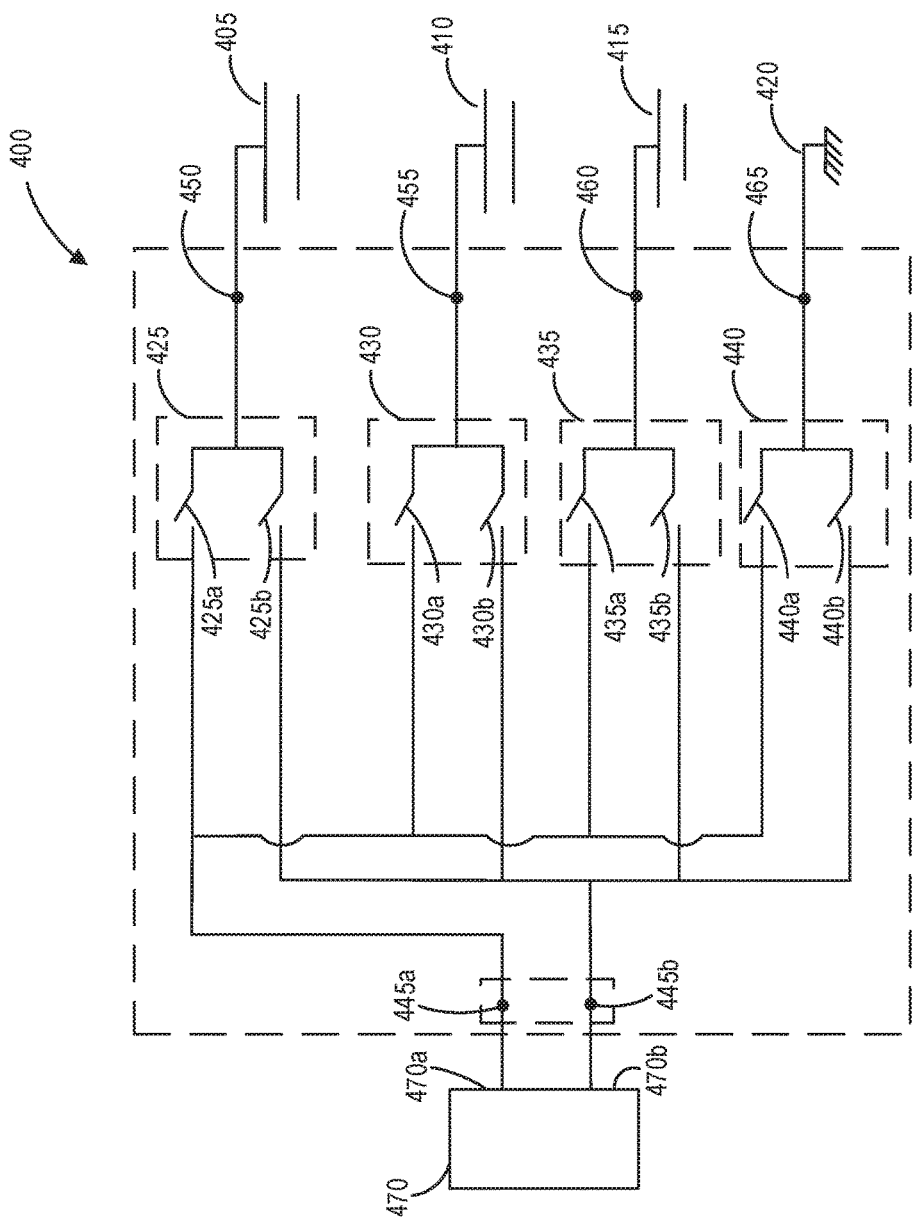
FIG. 4 illustrates a power converter according to another example embodiment.

Reference is next made to FIG. 4, which illustrates power converter 400 operating as a rectifier for converting power from a single phase AC source 470 to a plurality of independent DC loads 405, 410, and 415. Power converter 400 comprises a plurality of DC terminals 450, 455, 460, and 465, a plurality of converter cells 425, 430, 435, and 440, and an AC terminal 445.

DC terminals 450, 455, and 460, are coupled to independent DC loads 405, 410, and 415 respectively, where DC load 405 represents a first independent DC load, DC load 410 represents a second independent DC load, and DC load 415 represents an nth independent DC load. DC terminal 465 is coupled to ground 420.

AC terminal 445 comprises two AC terminal nodes, 445a and 445b, and is coupled to a single phase AC source 470. AC source 470 comprises a positive node 470a, and a negative node 470b.

Converter cells 425, 430, 435, and 440 are each coupled between a corresponding DC terminal 450, 455, 460, and 465, respectively, and the AC terminal 445. Each converter cell 425, 430, 435, and 440 comprises 2 bidirectional switches 425a, 425b, 430a, 430b, 435a, 435b, 440a, and 440b, where bidirectional switches 425a, 430a, 435, and 440a, are coupled to AC terminal node 445a, and bidirectional switches 425b, 430b, 435b, and 440b are coupled to AC terminal node 445b. AC terminal node 445a is coupled to a positive terminal 470a of AC source 470, and AC terminal node 445b is coupled to a negative terminal 470b of AC source 470.

Power converter 400 has various applications for charging a plurality of DC loads using a multi-level power output signal, where each DC load is charged to a different voltage level. For example, charging hybrid electric vehicles that contain a plurality of DC loads, (e.g. an ultra-capacitor and lithium ion battery), using a single phase AC source.

Although power converter 400 illustrates a rectifier for converting power between a single phase AC source and a plurality of DC loads, a rectifier for converting power from a three phase AC source and a plurality of DC loads can be inferred by using converter cells comprising three bidirectional switches per converter cell.

Figure 5:
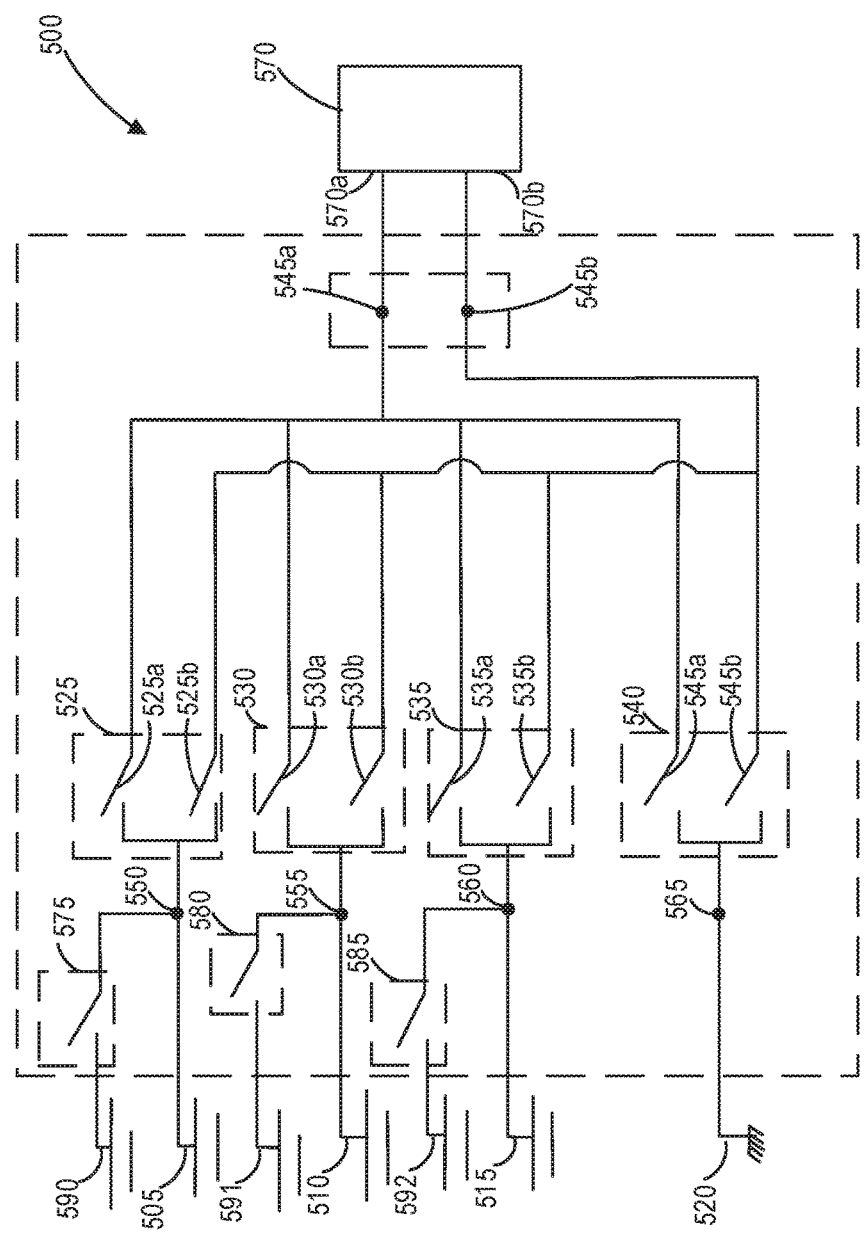
FIG. 5 illustrates a power converter according to another example embodiment.

Now referring to FIG. 5, which illustrates power converter 500 for converting power from a plurality of independent DC voltage sources 505, 510, 515, or a plurality of independent backup DC voltage sources 590, 591, 592 for fault tolerant operation, and a single phase AC load 570.

Power converter 500 comprises a plurality of DC terminals 550, 555, 560, and 565, a plurality of converter cells 525, 530, 535, and 540, a plurality of backup DC switches 575, 580, and 585, and an AC terminal 545.

DC terminals 550, 555, and 560, are coupled between converter cells 525, 530, and 535, and independent DC voltage sources 505, 510, and 515, and backup DC switches 575, 580, and 585, respectively. DC terminal 565 is coupled between ground 520 and converter cell 540.

DC voltage source 505 represents a first independent DC voltage source, DC voltage source 510 represents a second independent DC voltage source, and DC voltage source 515 represents an $n^{th}$ independent DC voltage source.

Backup DC switches 575, 580, and 585, each comprise a single bidirectional switch that is coupled between DC terminals 550, 555, and 560, and independent backup DC voltage sources 590, 591, and 592, respectively.

Converter cells 525, 530, and 535, are coupled between DC terminals 550, 555, and 560, respectively, and AC terminal 545. Converter cell 540 is coupled between DC terminal 565 and AC terminal 545. AC load 570 comprises a positive node 570a, and a negative node 570b.

AC terminal 545 comprises two AC terminal nodes, 545a, which is coupled to the positive node 570a of single phase AC load 570, and 545b, which is coupled to the negative node 570b of single phase AC load 570. Each converter cell comprises two bidirectional switches 525a, 525b, 530a, 530b, 535a, 535b, 540a, and 540b, where bidirectional switches 525a, 530a, 535a, and 540a are coupled to AC terminal node 545a, and bidirectional switches 525b, 530b, 535b, and 540b are coupled to AC terminal node 545b.

The switching states of each bidirectional switch in converter cells 525, 530, 535, 540, and backup DC switches 575, 580, and 585, are controlled by an embedded computing platform (not shown), which may include a digital signal processor board, microcontroller, or field programmable gate array.

Although power converter 500 illustrates an inverter for converting power from a plurality of independent DC voltage sources or a plurality of independent backup DC voltage sources, to a single phase AC load, a rectifier for converting power from a single phase AC source can be inferred. Similarly an inverter or rectifier for converting power between a three phase AC source or load to a plurality of DC sources or loads or backup DC sources or loads can be inferred by using converter cells comprising three bidirectional switches per converter cell.

Power converter 500 has various applications where fault tolerant operation is advantageous, for example, uninterruptable power supplies and integrated battery management systems for safety critical or mission critical systems. It can be also used to drive a three phases traction motor in an electrified vehicle.

Referring now to FIG. 6, which illustrates various example embodiments of bidirectional switches. Bidirectional switches used in converter cells or backup DC switches can be any bidirectional switches. FIG. 6A illustrates a bidirectional switch 600 according to a first example embodiment. FIG. 6B illustrates a bidirectional switch 605 according to a second example embodiment. FIG. 6C illustrates a bidirectional switch 610 according to a third example embodiment. FIG. 6D illustrates a bidirectional switch 615 according to a fourth example embodiment. FIG. 6E illustrates a bidirectional switch 620 according to a fifth embodiment.

In some cases, as illustrated, bidirectional switches 605, 610 and 620 include insulated-gate bipolar transistors or IGBTs. In some other cases, bidirectional switches 605, 610 and 620 include metal-oxide-semiconductor field-effect transistors or MOSFETs.

Figure 6C:
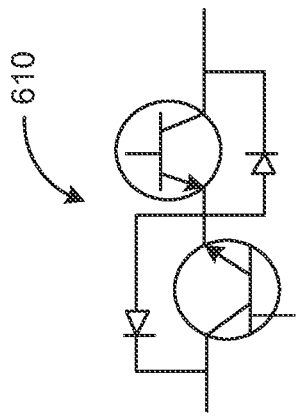
FIG. 6C illustrates a bidirectional switch according to a third example embodiment.
Figure 6E:
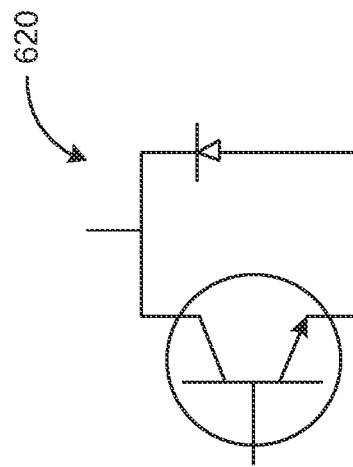
FIG. 6E illustrates a bidirectional switch according to a fifth example embodiment.
Figure 6B:
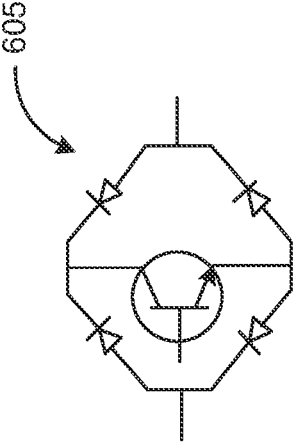
FIG. 6B illustrates a bidirectional switch according to a second example embodiment.
Figure 6D:
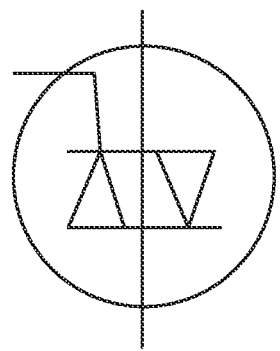
FIG. 6D illustrates a bidirectional switch according to a fourth example embodiment.
Figure 6A:
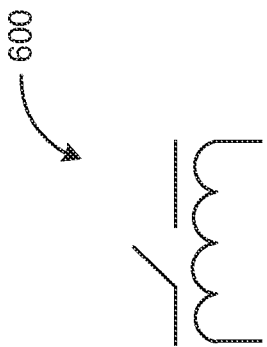
FIG. 6A illustrates a bidirectional switch according to a first example embodiment.

In one case, as illustrated, bidirectional switch 610 of FIG. 6C includes two IGBTs connected at respective emitters to provide a common emitter connection. In other cases, bidirectional switch 610 may include two IGBTs connected at respective collectors to provide a common collector connection. In some further cases, bidirectional switch 610 may include MOSFETs connected at respective drains or sources to provide a common drain or a common source connection.

Bidirectional switch 600 may be configured in a variety of different ways. For example, in one case, as illustrated, bidirectional switch 600 includes a single pole, single throw (SPST) relay or contactor. In some other cases, bidirectional switch 600 includes a single pole, double throw (SPDT) relay or contactor.

Solid-state bidirectional switches are typically used in power converters that require high switching frequency. Solid-state bidirectional switches include solid-state components, such as IGBTs, MOSFETs etc. Examples of solid-state bidirectional switches include switches 605, 610 and 620. Solid-state bidirectional switches have high switching speeds, such as, for example, switching speeds in the range of microseconds or less. Other bidirectional switches are typically used as relays or contactors. Such bidirectional switches have relatively lower switching speeds, such as, for example, switching speeds in the range of milliseconds or more.

Figure 8A:
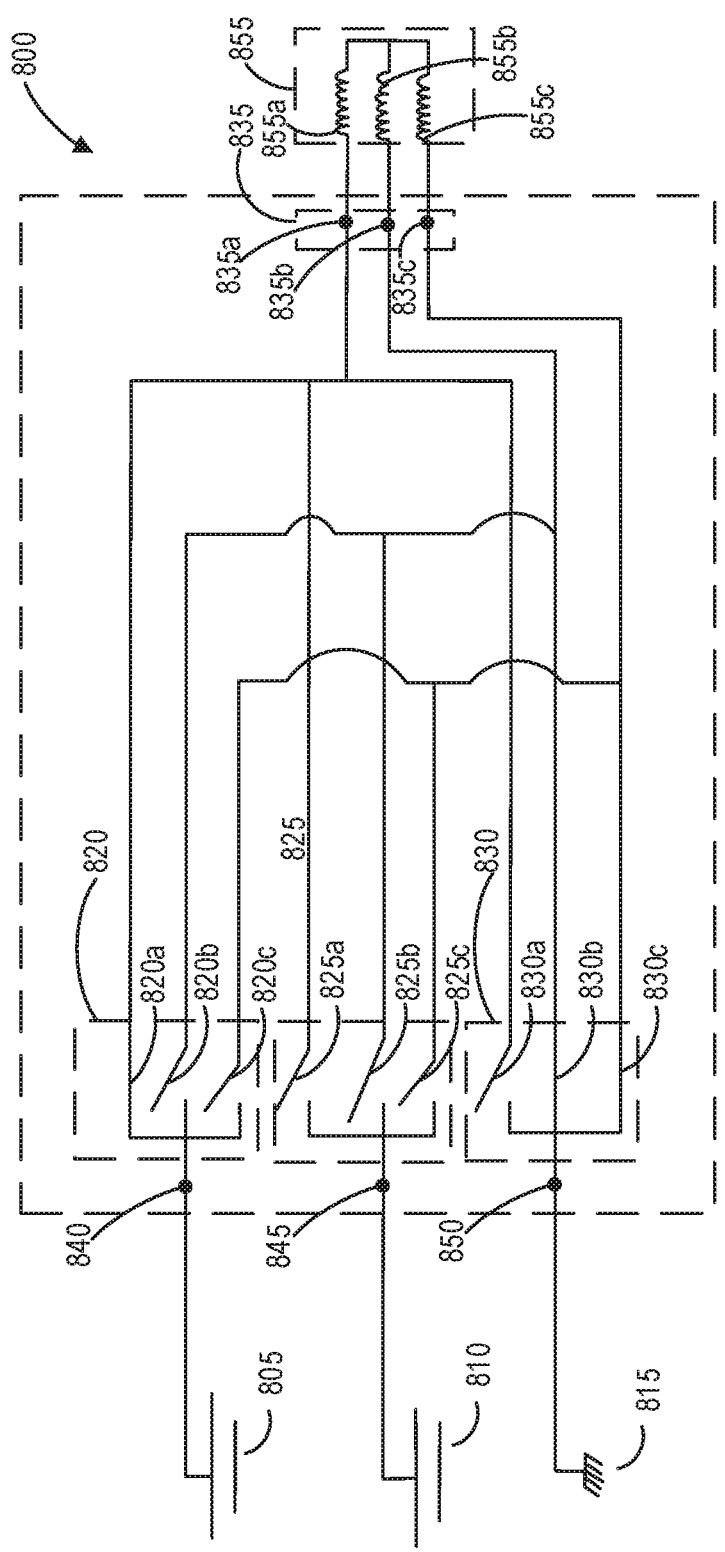
FIG. 8A illustrates a power converter operating in a first mode according to a first example embodiment.

Reference is made to FIG. 8A, which illustrates power converter 800 operating as an inverter in a first mode for converting power from independent DC voltage sources 805 and 810 to a three phase AC load 855, according to an example embodiment. In this mode, although two independent DC voltage sources 805, 810 are coupled to converter cells, the converter cells are conducting power from only one independent DC voltage source 805. Power converter 800 comprises three DC terminals 840, 845, and 850, three converter cells 820, 825, and 830, and an AC terminal 835. Each converter cell comprises three bidirectional switches 820a, 820b, 820c, 825a, 825b, 825c, 830a, 830b, and 830c. The AC terminal 835 comprises three AC terminal nodes, 835a, 835b, and 835c. AC load 855 comprises three phase nodes, 855a, 855b, and 855c which represent $V_{an}$, $V_{bn}$, and $V_{cn}$, respectively. AC terminal nodes 835a, 835b, and 835c are each coupled to corresponding AC load nodes 855a, 855b, and 855c, respectively.

Converter cells 820, 825, and 830, are coupled between DC terminals 840, 845, and 850, respectively, and AC terminal 835. DC terminals 840 is coupled to a first independent DC voltage source 805, DC terminal 845 is coupled to a second independent DC voltage source 810, and DC terminal 850 is coupled to ground 815.

Converter cells 820, 825, and 830, each comprise three bidirectional switches 820a, 820b, 820c, 825a, 825b, 825c, 830a, 830b, and 830c, wherein bidirectional switches 820a, 825a, 830a are coupled to AC terminal node 835a, bidirectional switches 820b, 825b, 830b are coupled to AC terminal 835b, and bidirectional switches 820c, 825c, and 830c are coupled to AC terminal 835c.

In this embodiment, bidirectional switches 820a, 830b, and 830c are closed, and bidirectional switches 820b, 820c, 825a, 825b, 825c, and 830a, are open. The power output signal generated at AC terminal nodes and the corresponding AC load nodes are as follows: $V_{an}$ is equal to the independent DC voltage source 805, $V_{bn}$ and $V_{cn}$ are equal to zero.

Figure 8B:
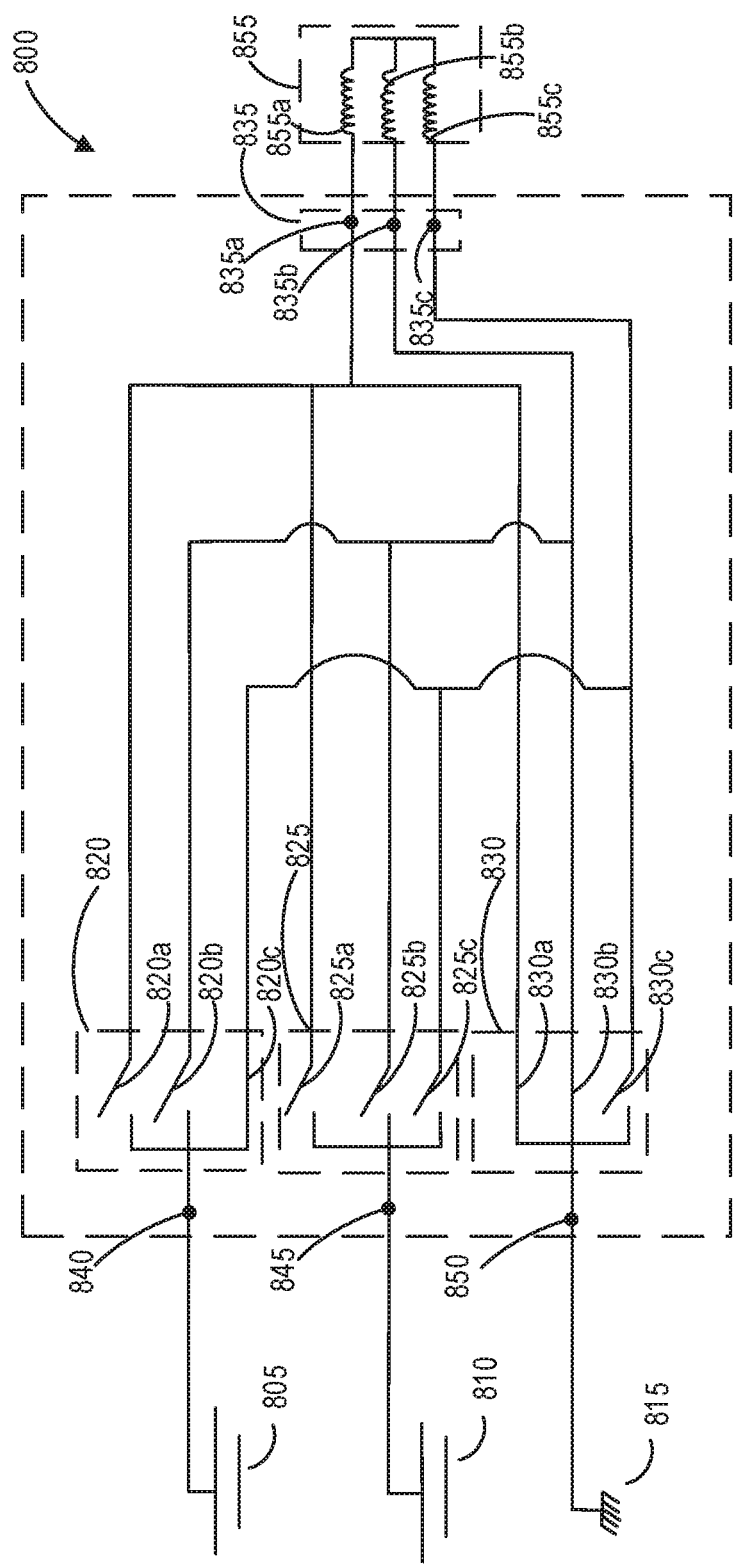
FIG. 8B illustrates a power converter operating in a first mode according to a second example embodiment.

Now referring to FIG. 8B, which illustrates an example embodiment of power converter 800 with a different bidirectional switch configuration to produce a different power output signal at AC terminal nodes and corresponding AC load nodes.

In this embodiment, bidirectional switches 820c, 830a, and 830b are closed, and bidirectional switches 820a, 820b, 825a, 825b, 825c, and 830c are open. The power output signal generated at AC terminal nodes and the corresponding AC load nodes are as follows: $V_{an}$ and $V_{bn}$ are equal to zero, and $V_{cn}$ is equal 805.

Figure 8C:
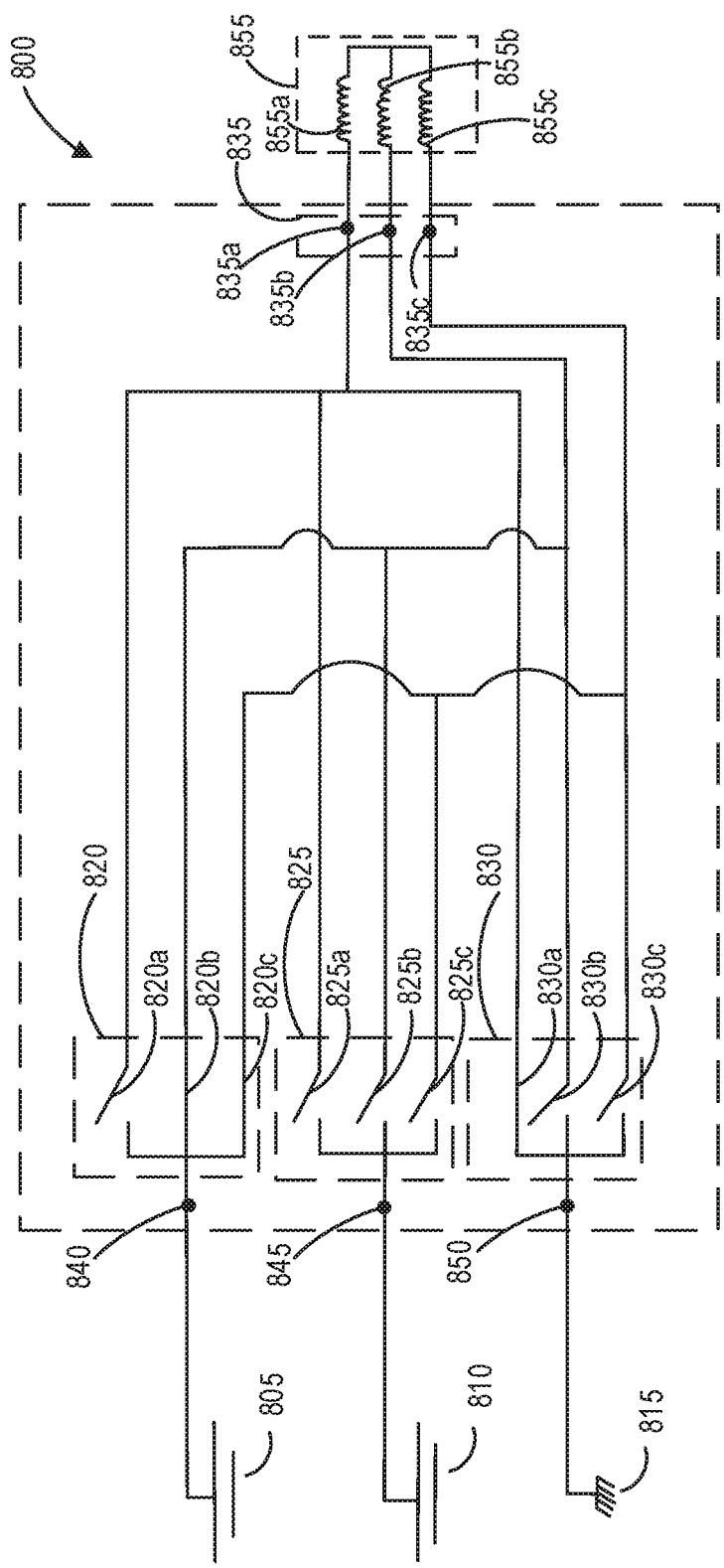
FIG. 8C illustrates a power converter operating in a first mode according to a third example embodiment.

Now referring to FIG. 8C, which illustrates an example embodiment of power converter 800 with a different bidirectional switch configuration to produce a different power output signal at AC terminal nodes and corresponding AC load nodes.

In this embodiment, bidirectional switches 820b, 820c, and 830a are closed, and bidirectional switches 820a, 825a, 825b, 825c, 830b, 830c are open. The power output signal generated at AC terminal nodes and the corresponding AC load nodes are as follows: $V_{an}$ is equal to zero, $V_{bn}$ and $V_{cn}$ are equal to independent DC voltage source 805.

Figure 8D:
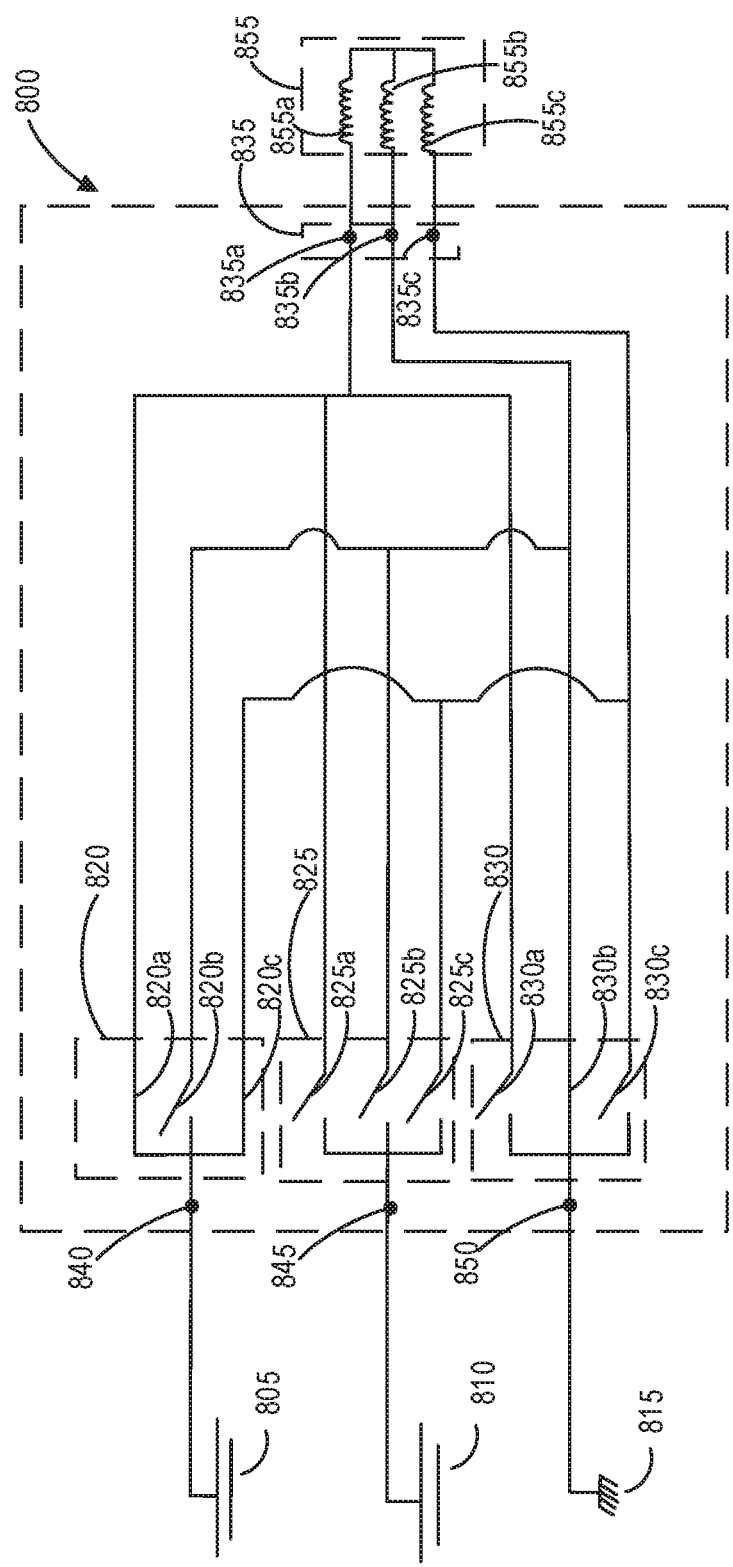
FIG. 8D illustrates a power converter operating in a first mode according to a fourth example embodiment.

Now referring to FIG. 8D, which illustrates an example embodiment of power converter 800 with a different bidirectional switch configuration to produce a different power output signal at AC terminal nodes and the corresponding AC load nodes.

In this embodiment, bidirectional switches 820a, 820c, and 830b are closed, and bidirectional switches 820b, 825a, 825b, 825c, 830a, and 830c are open. The power output signal at AC terminal nodes and the corresponding AC load nodes are as follows: $V_{an}$ and $V_{cn}$ are equal to independent DC voltage source 805, and $V_{bn}$ is equal to zero.

Figure 8E:
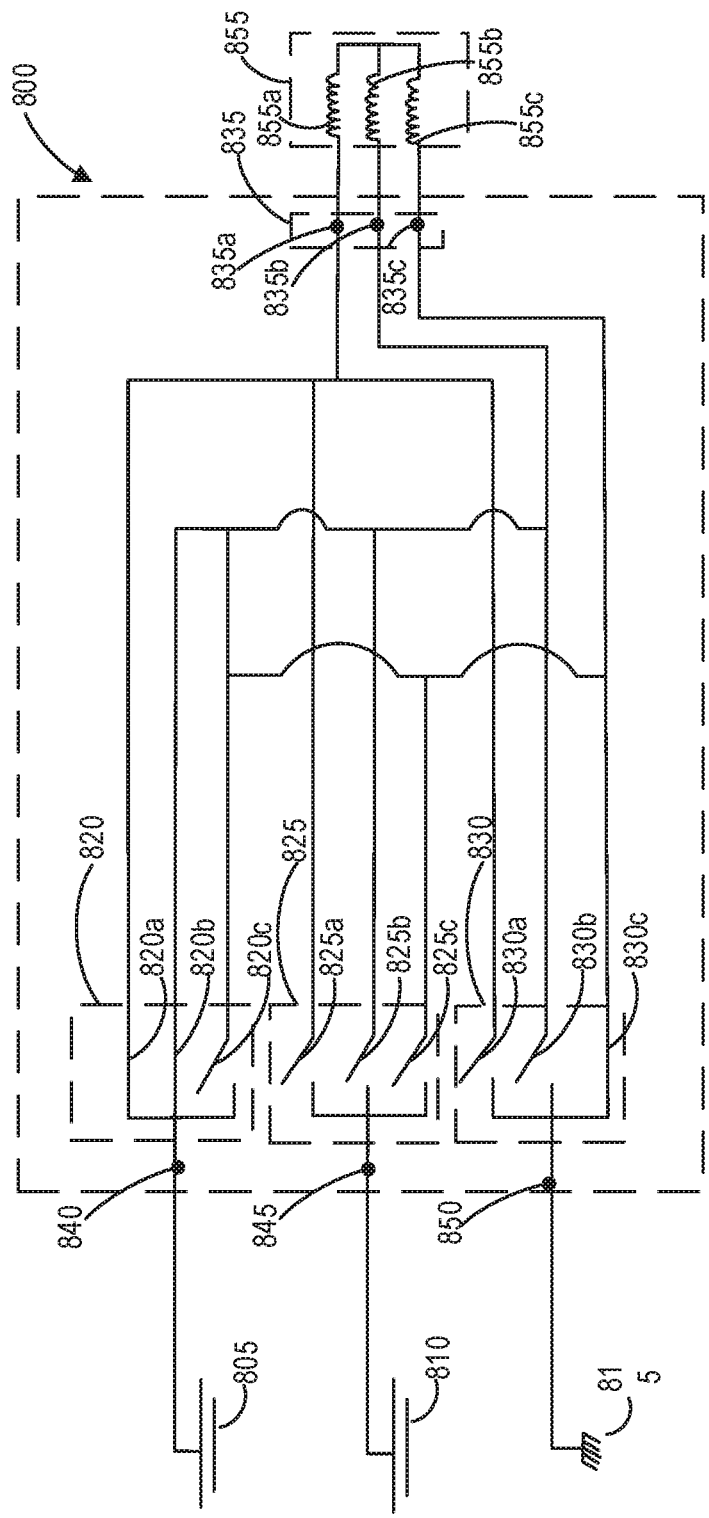
FIG. 8E illustrates a power converter operating in a first mode according to a fifth example embodiment.

Now referring to FIG. 8E, which illustrates power converter 800 with a different bidirectional switch configuration to produce a different power output signal at AC terminal nodes and corresponding AC load nodes.

In this embodiment, bidirectional switches 820a, 820b, and 830c are closed, and bidirectional switches 820c, 825a, 825b, 825c, 830a, and 830b are open. The power output signal generated at AC terminal nodes and the corresponding AC load nodes are as follows: $V_{an}$ and $V_{bn}$ are equal to independent DC voltage source 805, and $V_{cn}$ is equal to zero.

Figure 8F:
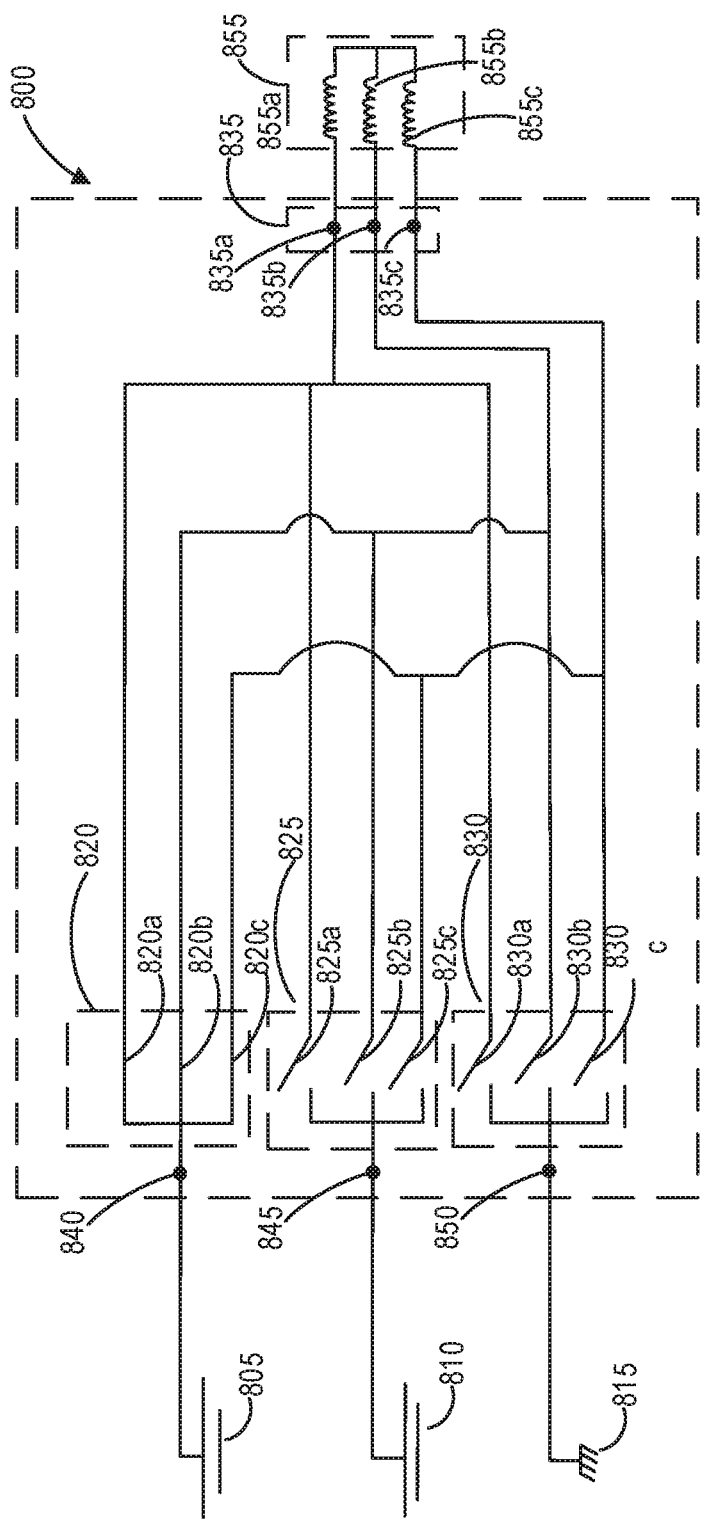
FIG. 8F illustrates a power converter operating in a first mode according to a sixth example embodiment.

Now referring to FIG. 8F, which illustrates power converter 800 with a different bidirectional switch configuration to produce a different power output signal at AC terminal nodes and corresponding AC load nodes.

In this embodiment, bidirectional switches 820a, 820b, and 820c are closed, and bidirectional switches 825a, 825b, 825c, 830a, 830b, and 830c, are open. The power output signal generated at AC terminal nodes and the corresponding AC load nodes are as follows: $V_{an}$, $V_{bn}$, and $V_{cn}$ are equal to independent DC voltage source 805.

Figure 8G:
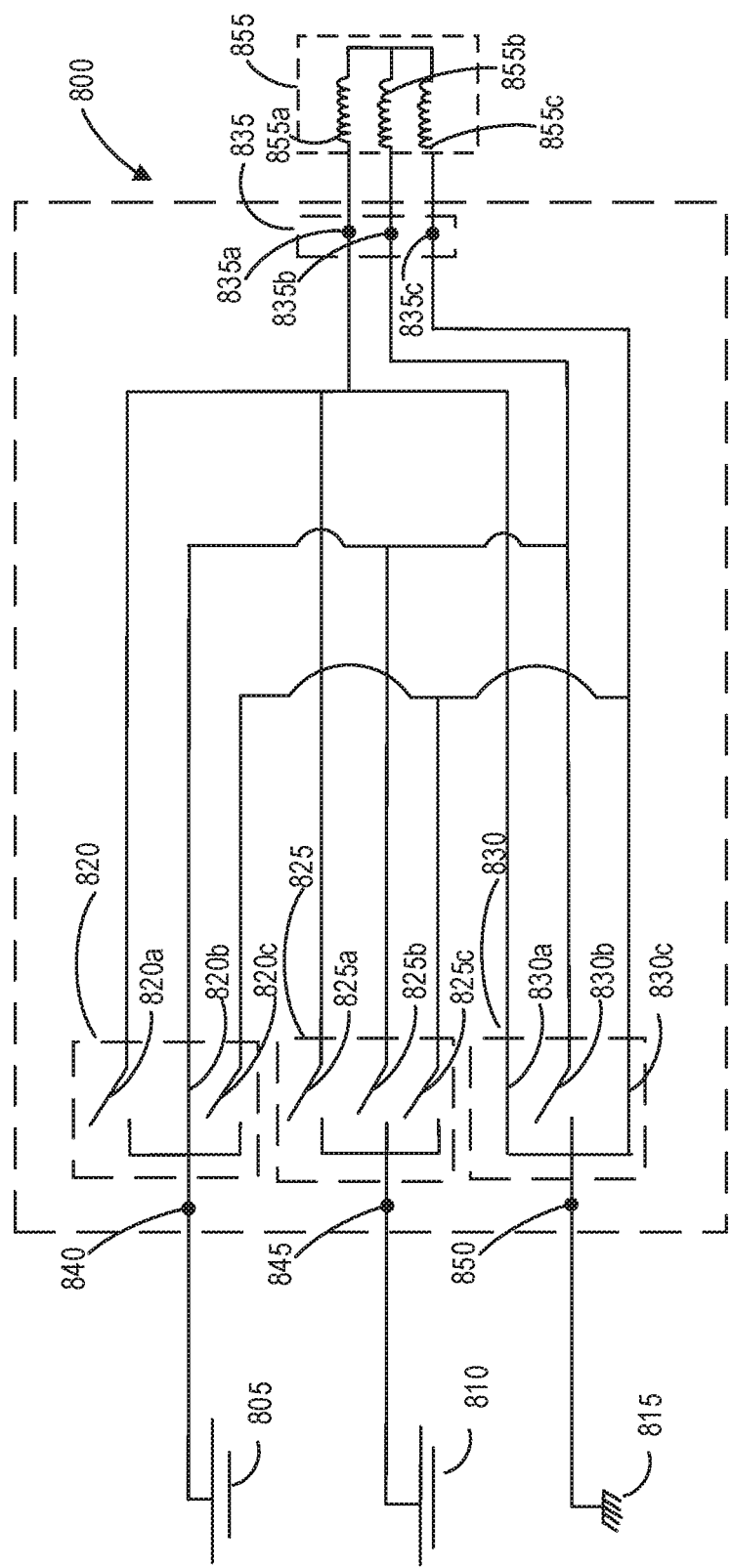
FIG. 8G illustrates a power converter operating in a first mode according to a seventh example embodiment.

Now referring to FIG. 8G, which illustrates power converter 800 with a different bidirectional switch configuration to produce a different power output signal at AC terminal nodes and corresponding AC load nodes.

In this embodiment, bidirectional switches 820b, 830a, and 830c are closed, and bidirectional switches 820a, 820c, 825a, 825b, 825c, and 830b are open. The power output signal at AC terminal nodes and corresponding AC load nodes are as follows: $V_{an}$ and $V_{cn}$ are equal to zero, and $V_{bn}$ is equal to independent DC voltage source 805.

Figure 7:
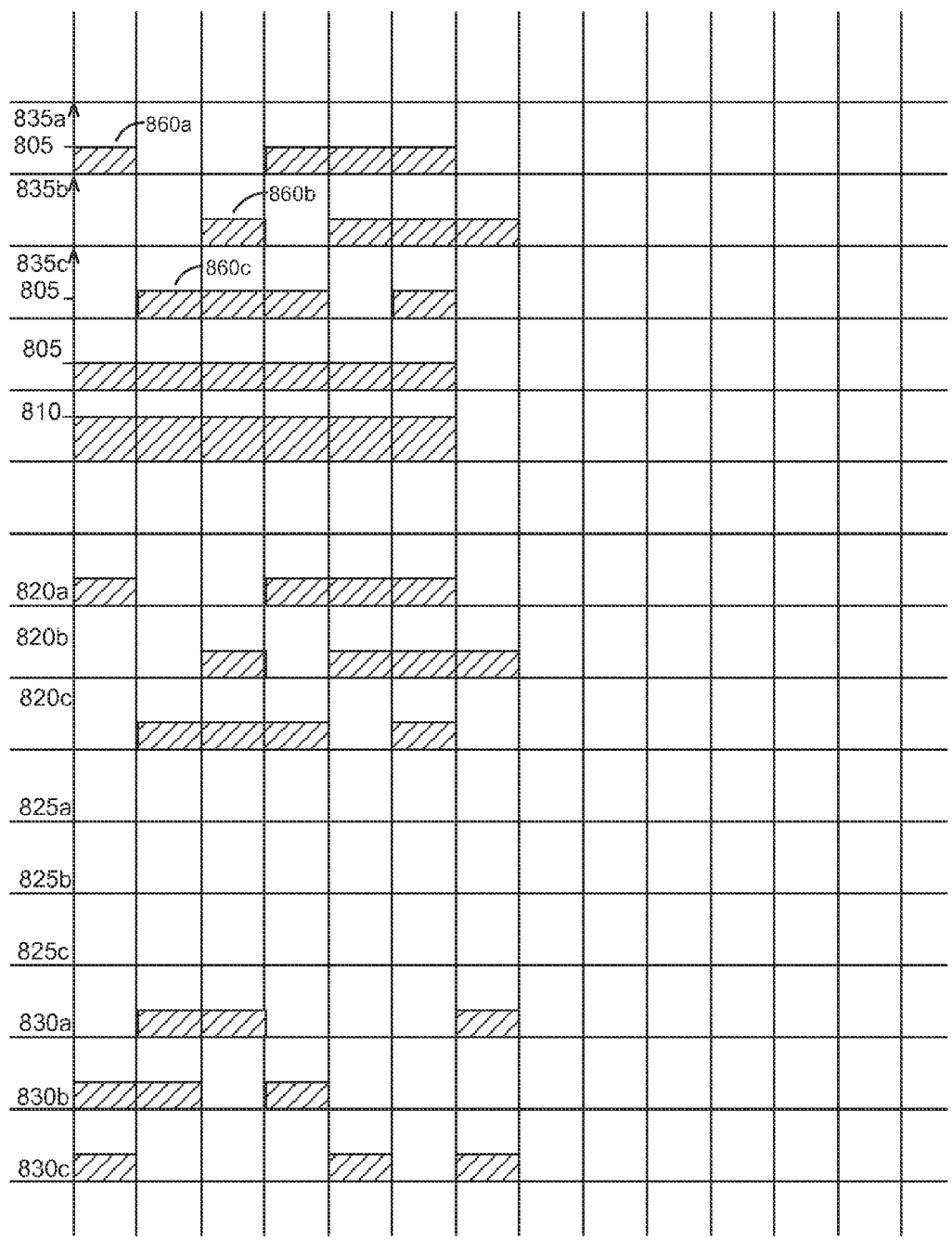
FIG. 7 illustrates a power output signal of a power converter according to an example embodiment.

Reference is made to FIG. 7, which illustrates the power output signal 860a, 860b, and 860c at corresponding AC terminal nodes 835a, 835b, and 835c, generated by power converter 800 operating in a first mode for each example embodiment illustrated in FIGS. 8A to 8G.

Figure 9A:
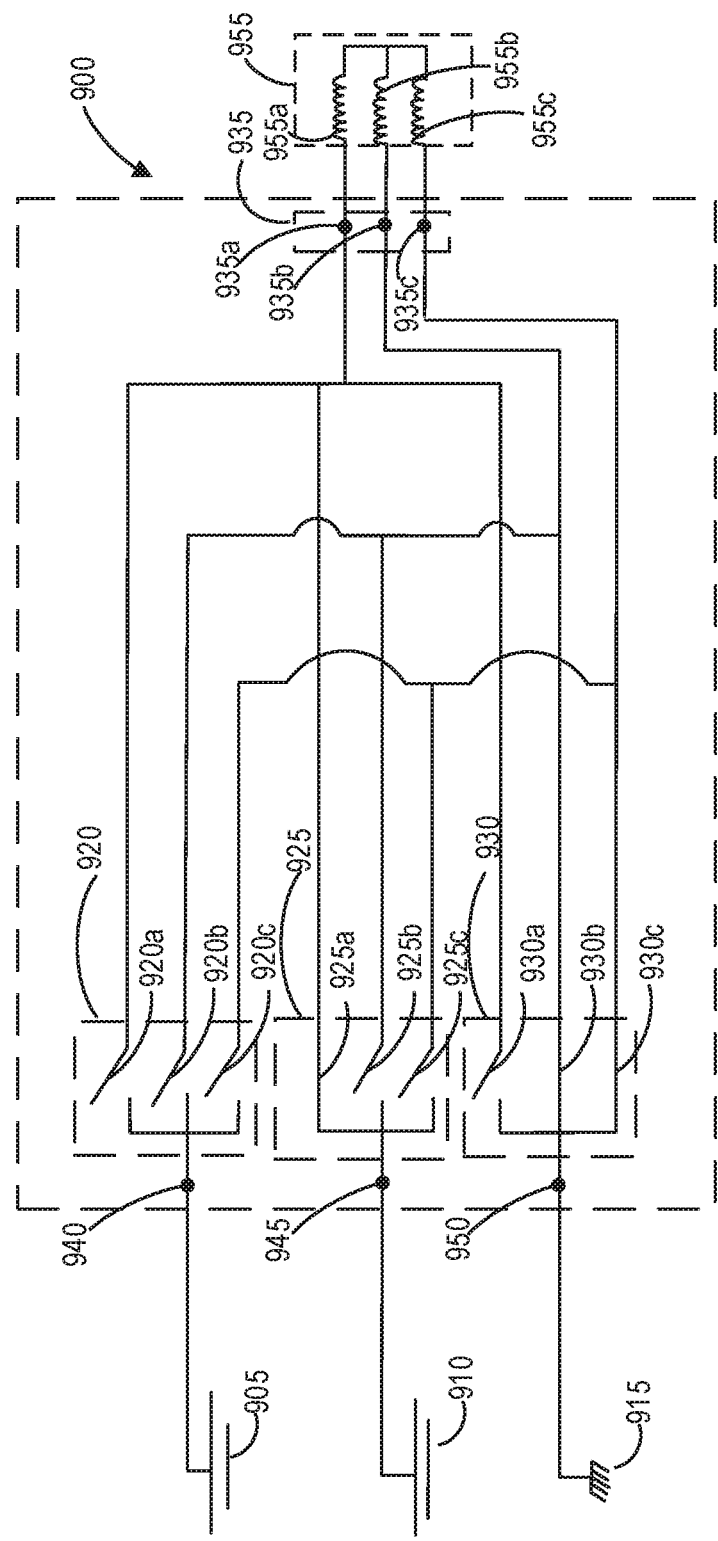
FIG. 9A illustrates a power converter operating in a second mode according to a first example embodiment.

Reference is made to FIG. 9A, which illustrates power converter 900 operating in a second mode as an inverter for converting power from two independent DC voltage sources 905 and 910 to a three phase AC load 955, according to an example embodiment. In this mode, the converter cells are conducting power from only one independent DC voltage source 910. Power converter 900 comprises three DC terminals 940, 945, and 950, three converter cells 920, 925, and 930, and an AC terminal 935. Each converter cell comprises three bidirectional switches 920a, 920b, 920c, 925a, 925b, 925c, 930a, 930b, and 930c. The AC terminal 935 comprises three AC terminal nodes, 935a, 935b, and 935c. AC load 955 comprises a three phase load with nodes, 955a, 955b, and 955c which represent $V_{an}$, $V_{bn}$, and $V_{cn}$, respectively. AC terminal nodes 935a, 935b, and 935c are each coupled to corresponding AC load nodes 955a, 955b, and 955c, respectively.

Converter cells 920, 925, and 930, are coupled between DC terminals 940, 945, and 950, respectively, and AC terminal 935. DC terminals 940 is coupled to a first independent DC voltage source 905, DC terminal 945 is coupled to a second independent DC voltage source 910, and DC terminal 950 is coupled to ground 915.

Converter cells 920, 925, and 930, each comprise three bidirectional switches 920a, 920b, 920c, 925a, 925b, 925c, 930a, 930b, 930c, wherein bidirectional switches 920a, 925a, 930a are coupled to AC terminal node 935a, bidirectional switches 920b, 925b, 930b are coupled to AC terminal 935b, and bidirectional switches 920c, 925c, and 930c are coupled to AC terminal 935c.

In this embodiment, bidirectional switches 925a, 930b, and 930c are closed, and bidirectional switches 920a, 920b, 920c, 925b, 925c, and 930a, are open. The power output signal generated at AC terminal nodes and the corresponding AC load nodes are as follows: $V_{an}$ is equal to the independent DC voltage source 910, $V_{bn}$ and $V_{cn}$ are equal to zero.

Figure 9B:
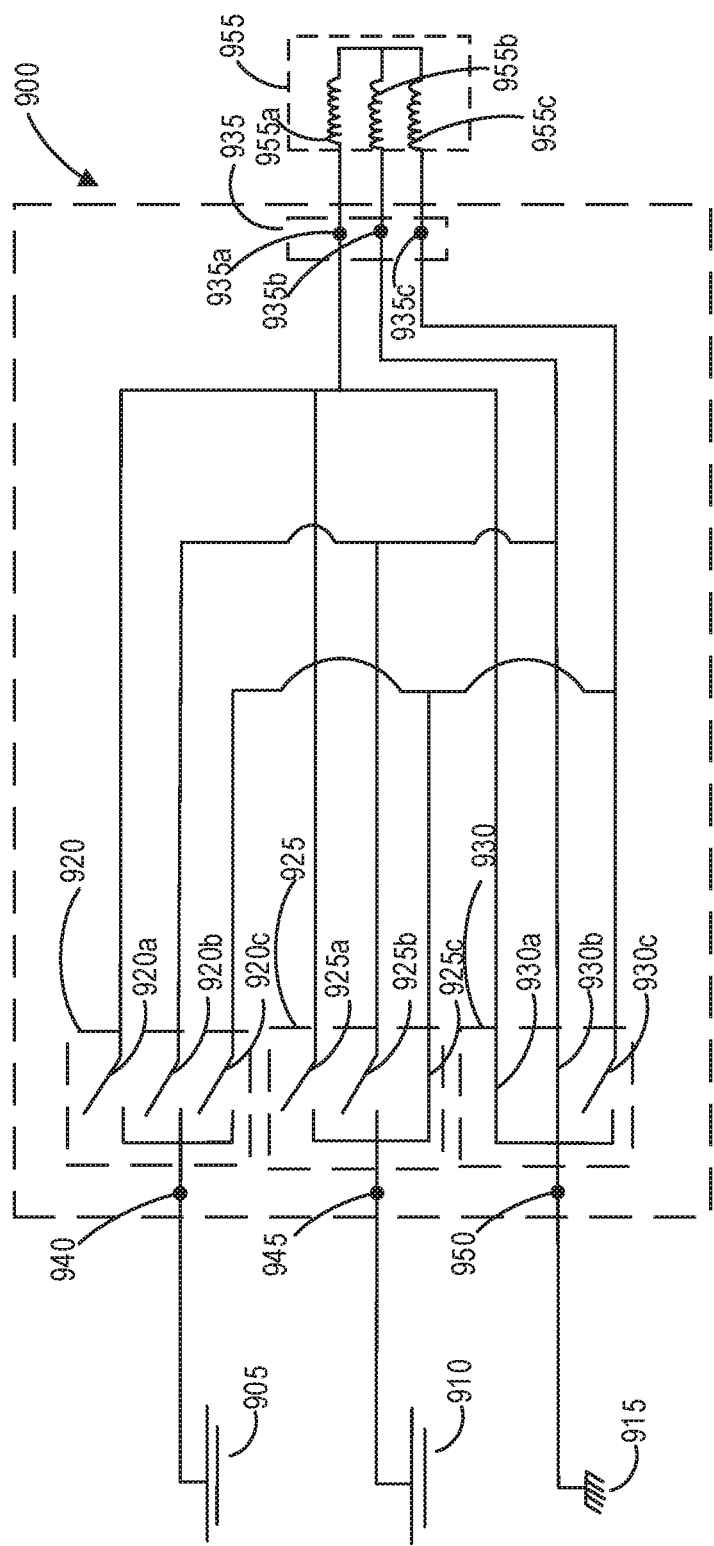
FIG. 9B illustrates a power converter operating in a second mode according to a second example embodiment.

Reference is now made to FIG. 9B, which illustrates an example embodiment of power converter 900 with a different bidirectional switch configuration to produce a different power output signal at AC terminal nodes and corresponding AC load nodes.

In this embodiment, bidirectional switches 925c, 930a, and 930b are closed, and bidirectional switches 920a, 920b, 920c, 925a, 925b, and 930c are open. The power output signal generated at AC terminal nodes and the corresponding AC load nodes are as follows: $V_{an}$ and $V_{bn}$ are equal to zero, and $V_{cn}$ is equal to the independent DC voltage source 910.

Figure 9C:
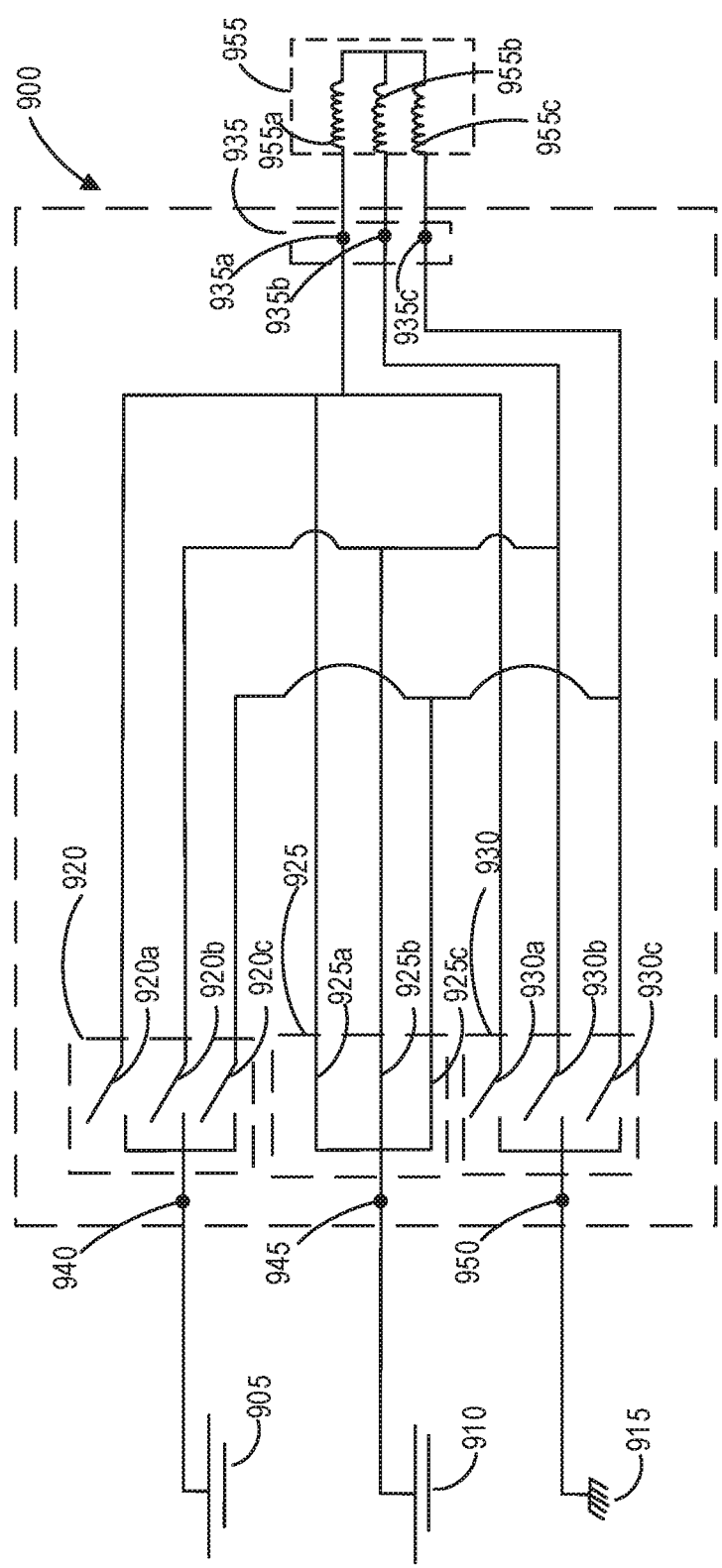
FIG. 9C illustrates a power converter operating in a second mode according to a third example embodiment.

Reference is now made to FIG. 9C, which illustrates an example embodiment of power converter 900 with a different bidirectional switch configuration to produce a different power output signal at AC terminal nodes and corresponding AC load nodes.

In this embodiment, bidirectional switches 925a, 925b, 925c are closed, and bidirectional switches 920a, 920b, 920c, 930a, 930b, and 930c are open. The power output signal generated at AC terminal nodes and the corresponding AC load nodes are as follows: $V_{an}$, $V_{bn}$, and $V_{cn}$ are equal to the magnitude of independent DC voltage source 910.

Figure 9D:
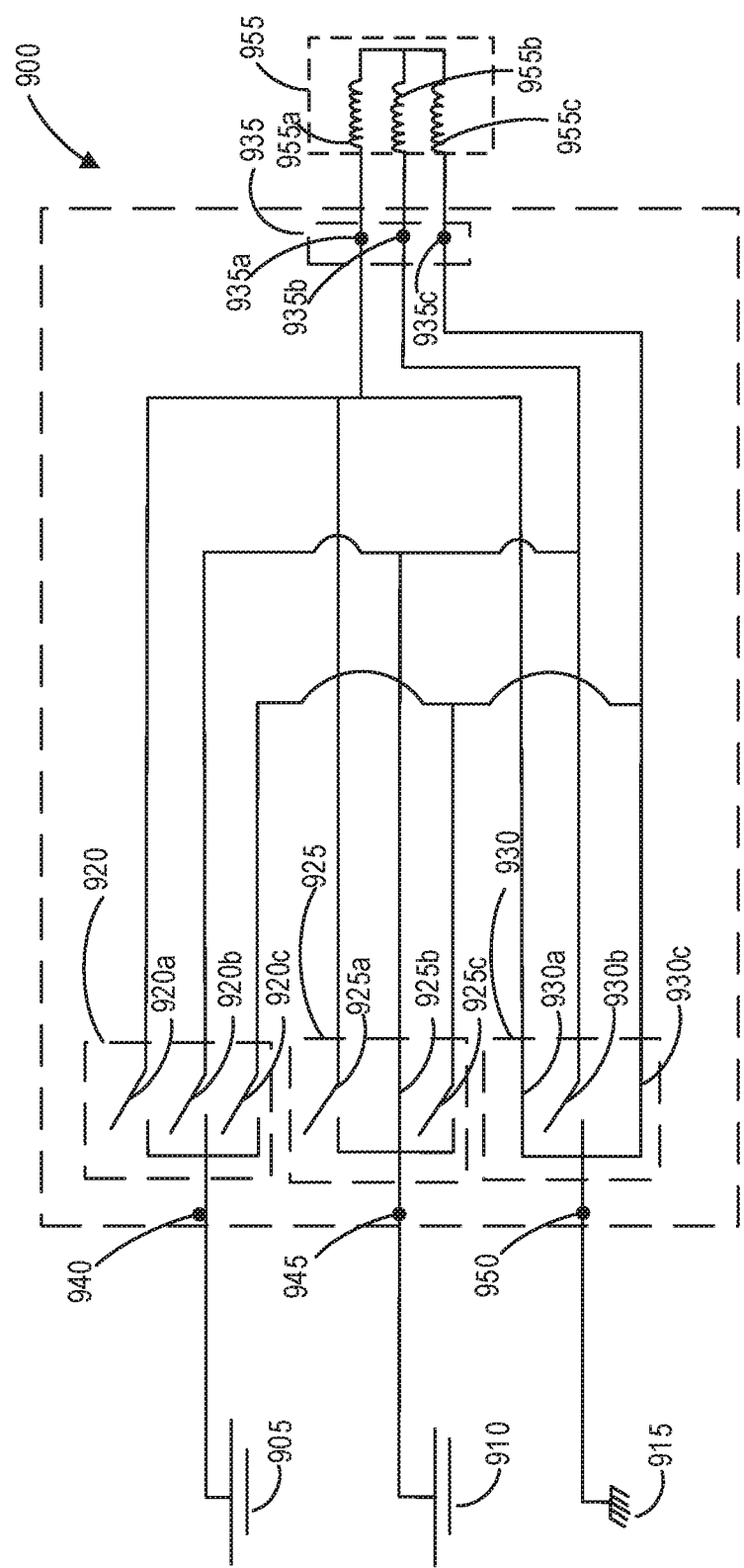
FIG. 9D illustrates a power converter operating in a second mode according to a fourth example embodiment.

Reference is now made to FIG. 9D, which illustrates an example embodiment of power converter 900 with a different bidirectional switch configuration to produce a different power output signal at AC terminal nodes and corresponding AC load nodes.

In this embodiment, bidirectional switches 925b, 930a, and 930c are closed, and bidirectional switches 920a, 920b, 920c, 925a, 925c, and 930b are open. The power output signal generated at AC terminal nodes and the corresponding AC load nodes are as follows: $V_{an}$ and $V_{cn}$ are equal to zero, and $V_{bn}$ is equal to the magnitude of independent DC voltage source 910.

Figure 9E:
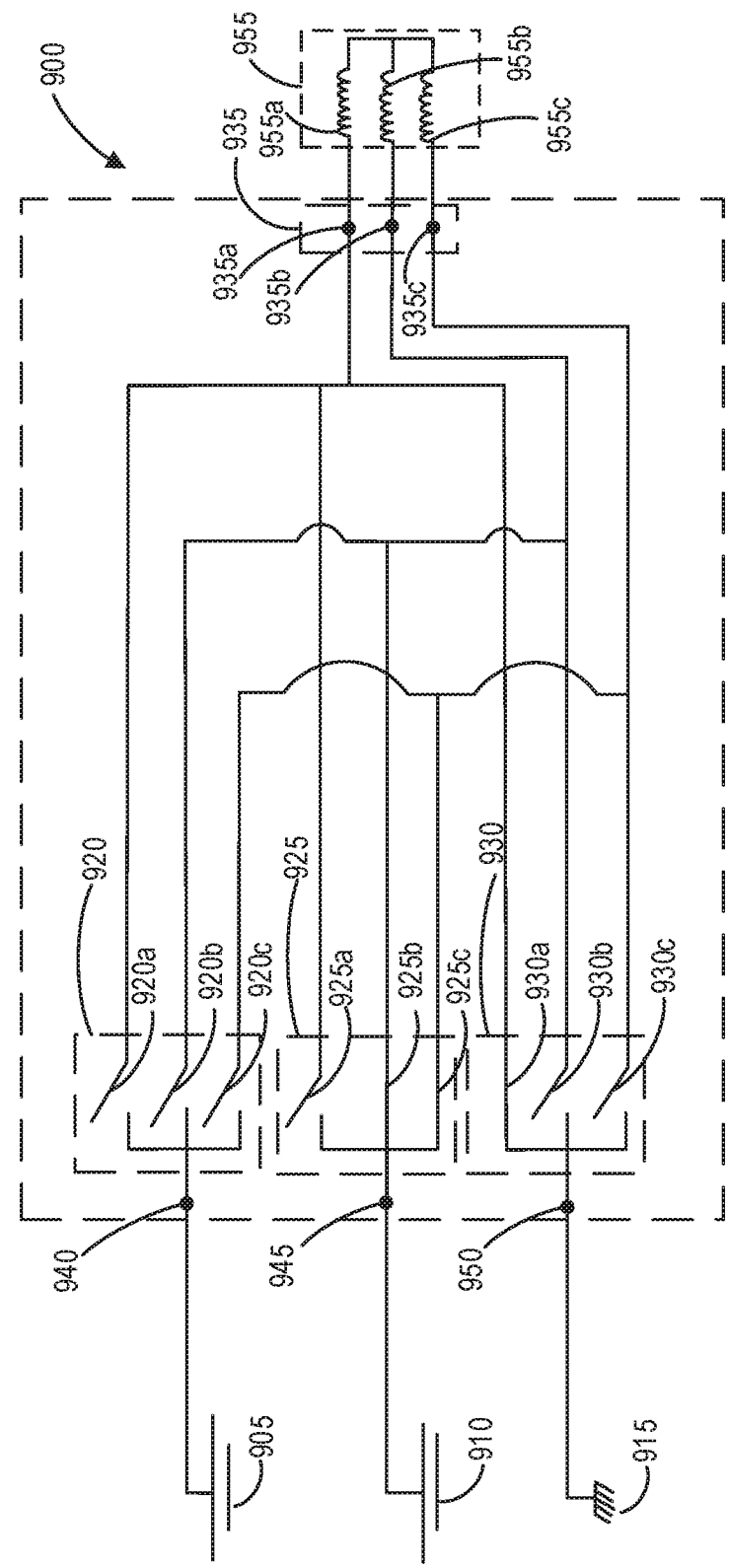
FIG. 9E illustrates a power converter operating in a second mode according to a fifth example embodiment.
Figure 9E:
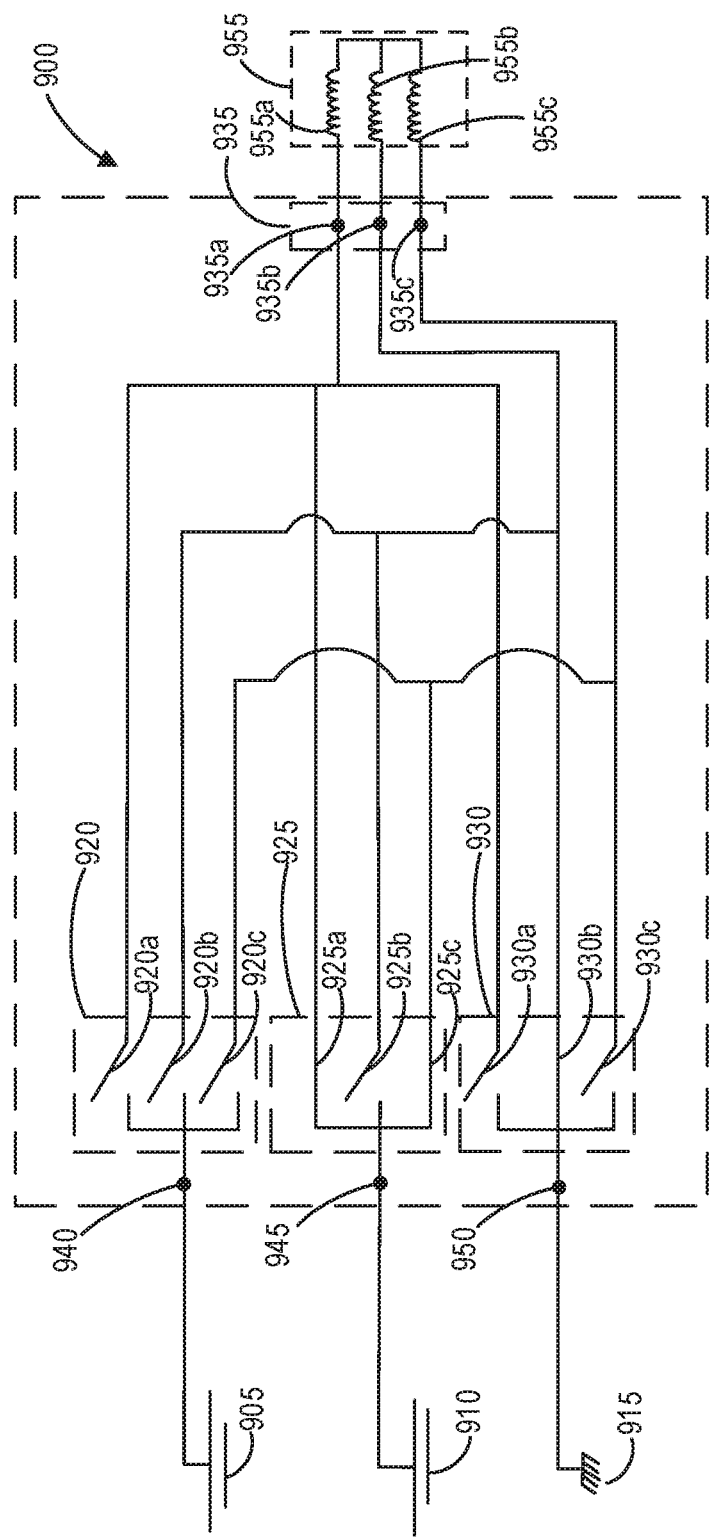

Reference is now made to FIG. 9E, which illustrates an example embodiment of power converter 900 with a different bidirectional switch configuration to produce a different power output signal at AC terminal nodes and corresponding AC load nodes.

In this embodiment, bidirectional switches 925b, 925c, and 930a are closed, and bidirectional switches 920a, 920b, 920c, 925a, 930b, and 930c, are open. The power output signal generated at AC terminal nodes and the corresponding AC load nodes are as follows: $V_{an}$ is equal to zero and $V_{bn}$ and $V_{cn}$ are equal to the independent DC voltage source 910.

Reference is now made to FIG. 9F, which illustrates an example embodiment of power converter 900 with a different bidirectional switch configuration to produce a different power output signal at AC terminal nodes and corresponding AC load nodes.

In this embodiment, bidirectional switches 925a, 925c, and 930b are closed, and bidirectional switches 920a, 920b, 920c, 925b, 930a, and 930c are open. The power output signal generated at AC terminal nodes and the corresponding AC load nodes are as follows: $V_{an}$ and $V_{cn}$ are equal to the magnitude of independent DC voltage source 910 and $V_{bn}$ is equal zero.

Figure 9G:
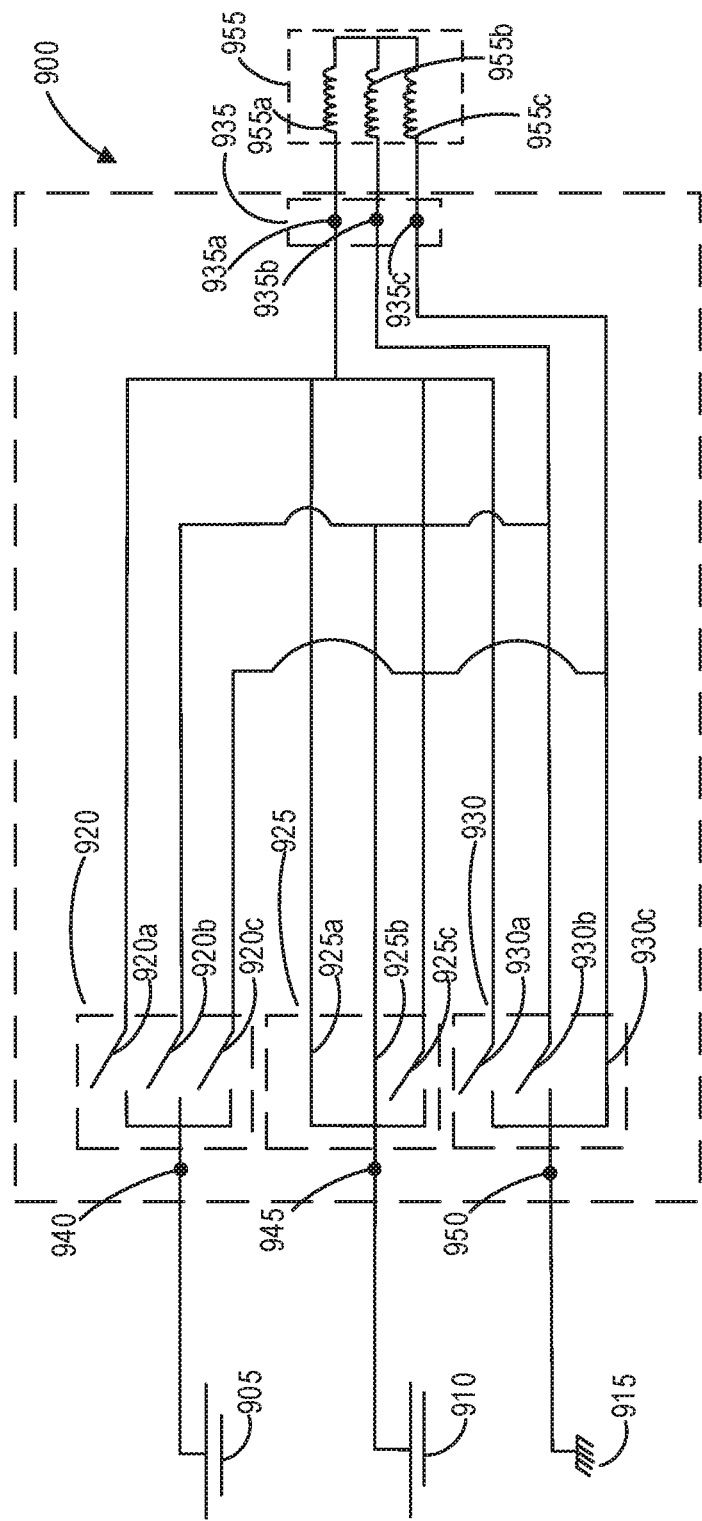
FIG. 9G illustrates a power converter operating in a second mode according to a seventh example embodiment.

Reference is now made to FIG. 9G, which illustrates an example embodiment of power converter 900 with a different bidirectional switch configuration to produce a different power output signal at AC terminal nodes and corresponding AC load nodes.

In this embodiment, bidirectional switches 925a, 925b, and 930c are closed, and bidirectional switches 920a, 920b, 920c, 925c, 930a, and 930b, are open. The power output signal generated at AC terminal nodes and the corresponding AC load nodes are as follows: $V_{cn}$ is equal to zero and $V_{an}$ and $V_{bn}$ are equal to the independent DC voltage source 910.

Figure 10A:
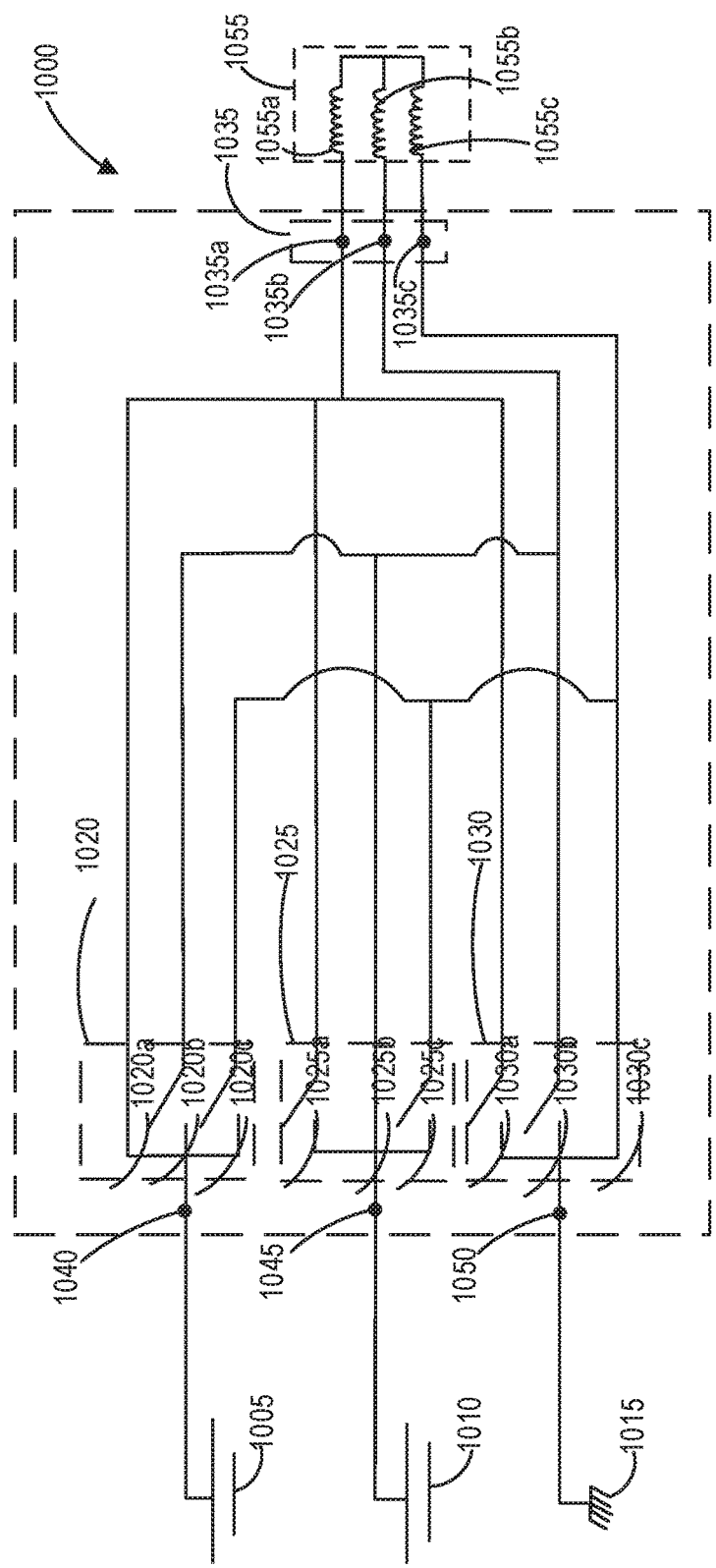
FIG. 10A illustrates a power converter operating in a third mode according to a first example embodiment.

Reference is made to FIG. 10A, which illustrates power converter 1000 operating in a third mode as an inverter for converting power from two independent DC voltage sources 1005 and 1010 to a three phase AC load 1055, according to an example embodiment. Power converter 1000 comprises three DC terminals 1040, 1045, and 1050, three converter cells 1020, 1025, and 1030, and an AC terminal 1035. Each converter cell comprises three bidirectional switches 1020a, 1020b, 1020c, 1025a, 1025b, 1025c, 1030a, 1030b, and 1030c. The AC terminal 1035 comprises three AC terminal nodes, 1035a, 1035b, and 1035c. AC load 1055 comprises three phase nodes, 1055a, 1055b, and 1055c which represent $V_{an}$, $V_{bn}$, and $V_{cn}$, respectively. AC terminal nodes 1035a, 1035b, and 1035c are each coupled to corresponding AC load nodes 1055a, 1055b, and 1055c, respectively.

Converter cells 1020, 1025, and 1030, are coupled between DC terminals 1040, 1045, and 1050, respectively, and AC terminal 1035. DC terminals 1040 is coupled to a first independent DC voltage source 1005, DC terminal 1045 is coupled to a second independent DC voltage source 1010, and DC terminal 1050 is coupled to ground 1015.

Converter cells 1020, 1025, and 1030, each comprise three bidirectional switches 1020a, 1020b, 1020c, 1025a, 1025b, 1025c, 1030a, 1030b, 1030c, wherein bidirectional switches 1020a, 1025a, 1030a are coupled to AC terminal node 1035a, bidirectional switches 1020b, 1025b, 1030b are coupled to AC terminal 1035b, and bidirectional switches 1020c, 1025c, and 1030c are coupled to AC terminal 1035c.

Figure 10B:
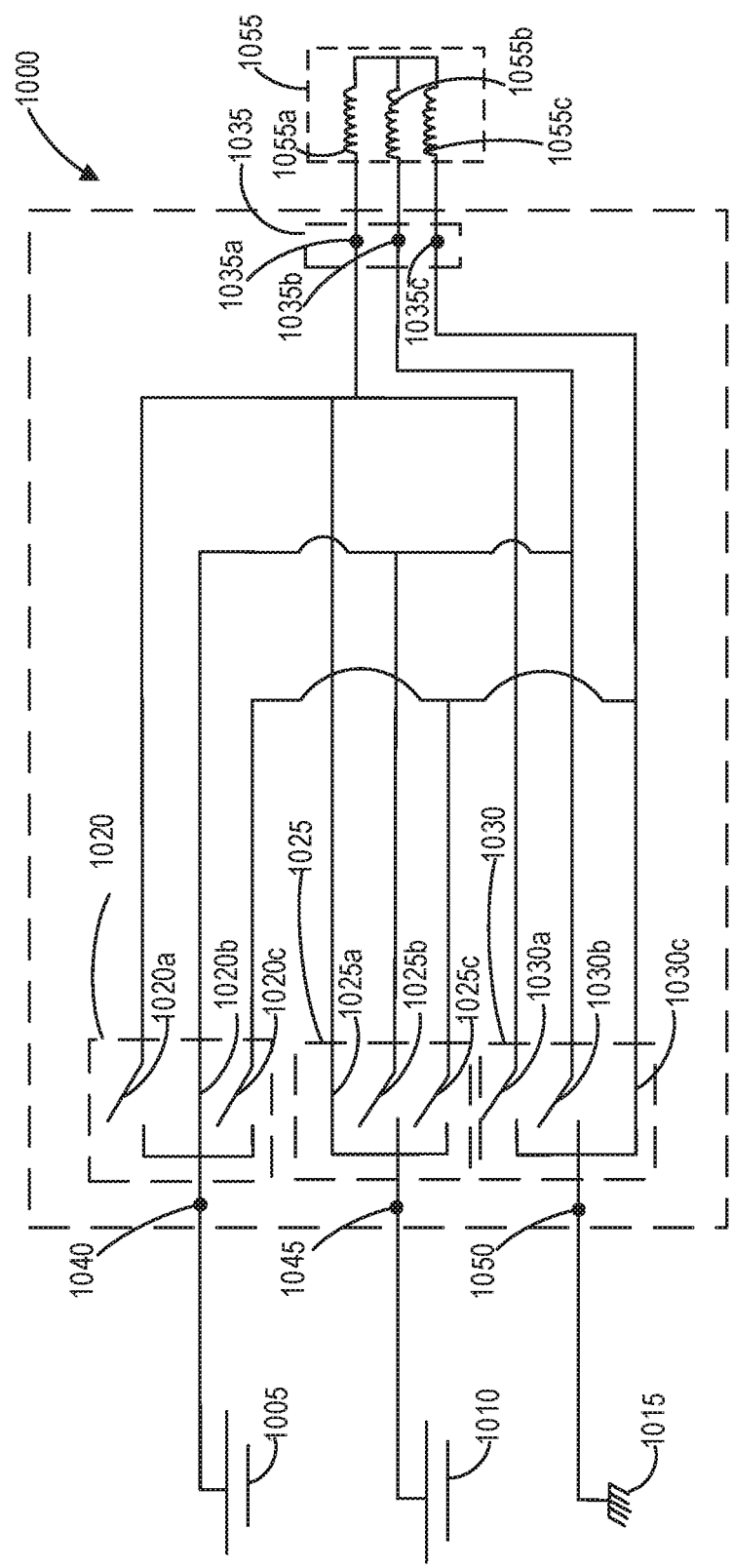
FIG. 10B illustrates a power converter operating in a third mode according to a second example embodiment.

In this embodiment, bidirectional switches 1020a, 1025b, and 1030c are closed, and bidirectional switches 1020b, 1020c, 1025a, 1025c, 1030a, and 1030b are open. The power output signal generated at AC terminal nodes and the corresponding AC load nodes are as follows: $V_{an}$ is equal to the magnitude of independent DC voltage source 1005, $V_{bn}$ is equal to the magnitude of independent DC voltage source 1010, and $V_{cn}$ is equal zero Reference is now made to FIG. 10B, which illustrates an example embodiment of power converter 1000 with a different bidirectional switch configuration to produce a different power output signal at AC terminal nodes and corresponding AC load nodes.

In this embodiment, bidirectional switches 1020b, 1025a, and 1030c are closed, and bidirectional switches 1020a, 1020c, 1025b, 1025c, 1030a, and 1030b are open. The power output signal generated at AC terminal nodes and the corresponding AC load nodes are as follows: $V_{an}$ is equal to the magnitude of independent DC voltage source 1010, $V_{bn}$ is equal to the magnitude of independent DC voltage source 1005, and $V_{cn}$ is equal to zero.

Figure 10C:
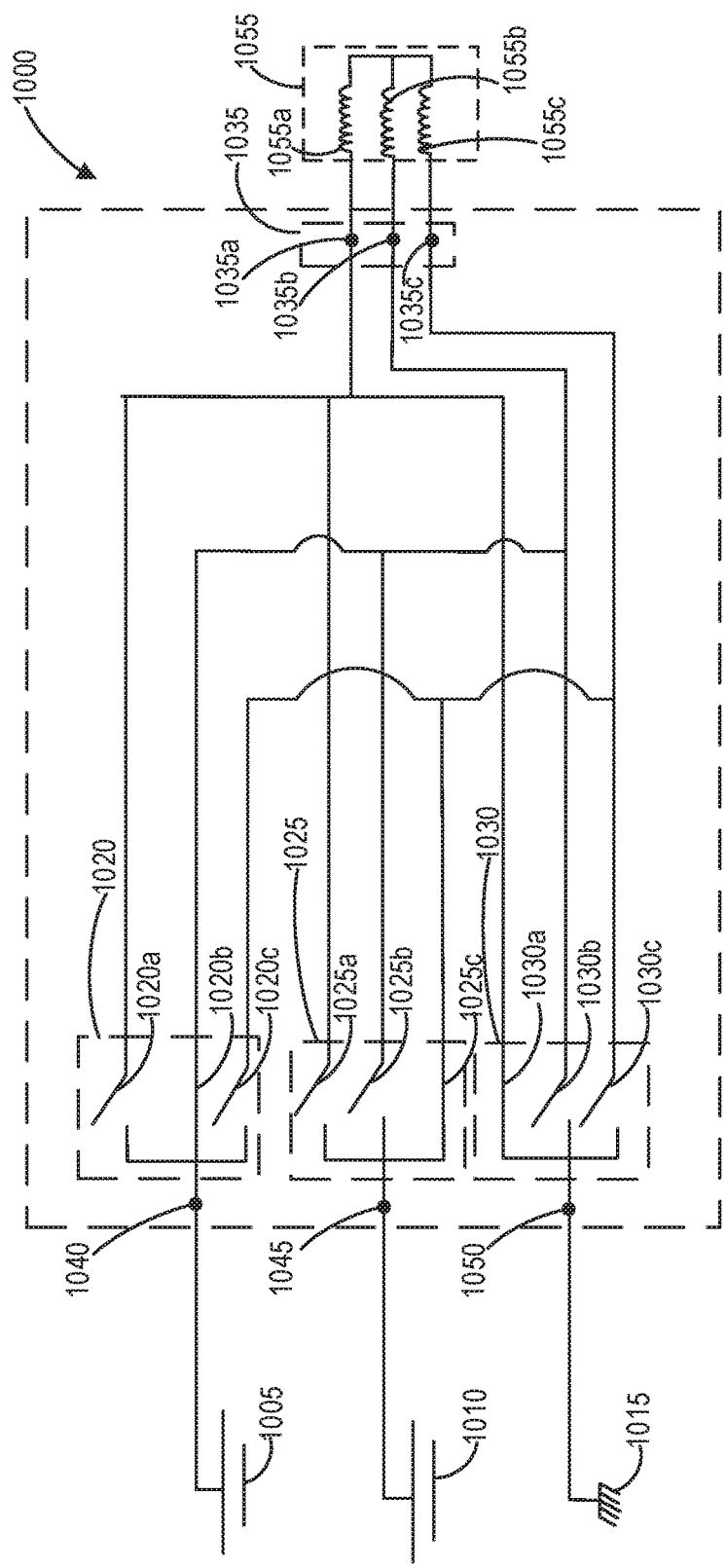
FIG. 10C illustrates a power converter operating in a third mode according to a third example embodiment.

Reference is now made to FIG. 10C, which illustrates an example embodiment of power converter 1000 with a different bidirectional switch configuration to produce a different power output signal at AC terminal nodes and corresponding AC load nodes.

In this embodiment, bidirectional switches 1020b, 1025c, and 1030a are closed, and bidirectional switches 1020a, 1020c, 1025a, 1025b, 1030b, and 1030c are open. The power output signal generated at AC terminal nodes and the corresponding AC load nodes are as follows: $V_{an}$ is equal to zero, $V_{bn}$ is equal to the magnitude of independent DC voltage source 1005, and $V_{cn}$ is equal to the magnitude of independent DC voltage source 1010.

Figure 10D:
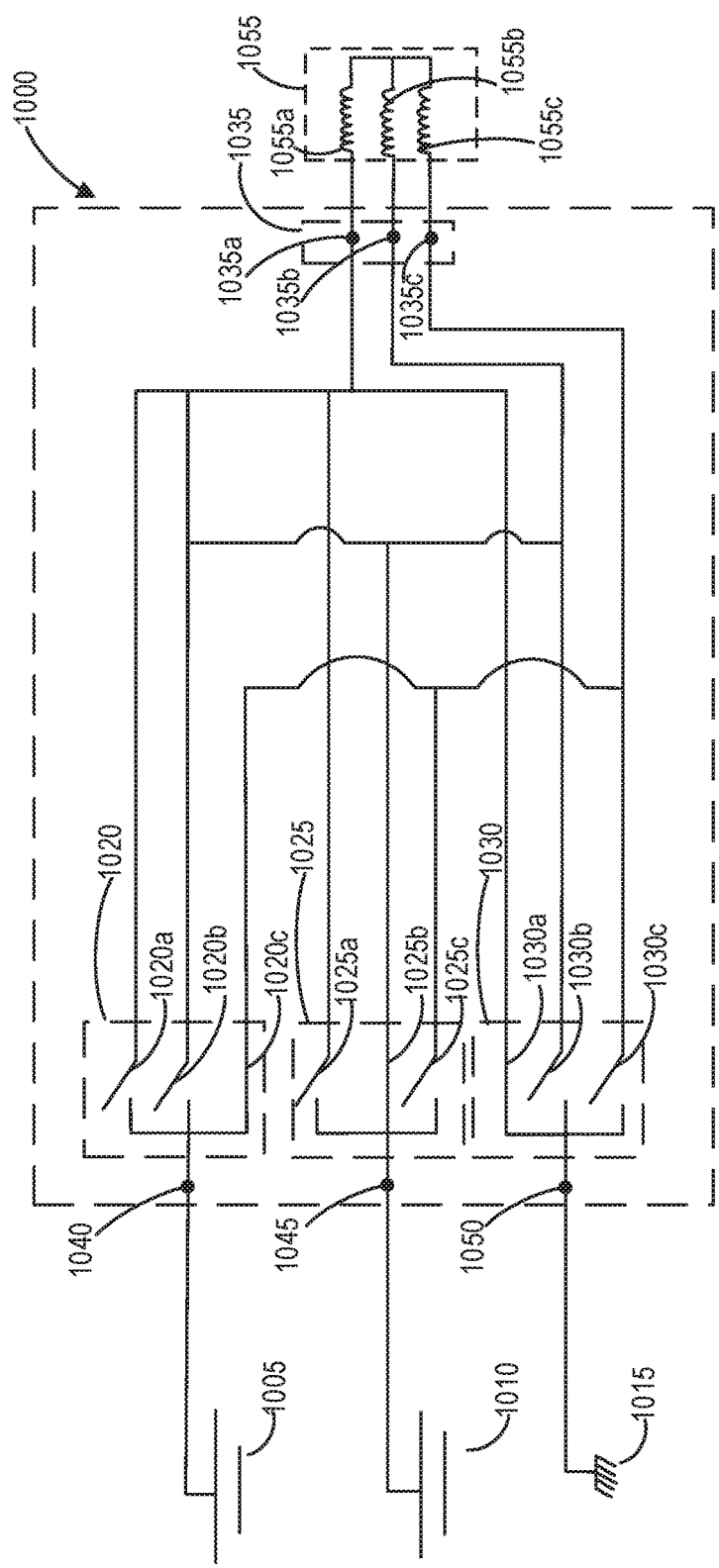
FIG. 10D illustrates a power converter operating in a third mode according to a fourth example embodiment.

Reference is now made to FIG. 10D, which illustrates an example embodiment of power converter 1000 with a different bidirectional switch configuration to produce a different power output signal at AC terminal nodes and corresponding AC load nodes.

In this embodiment, bidirectional switches 1020c, 1025b, and 1030a are closed, and bidirectional switches 1020a, 1020b, 1025a, 1025c, 1030b, and 1030c are open. The power output signal generated at AC terminal nodes and the corresponding AC load nodes are as follows: $V_{an}$ is equal to zero, $V_{bn}$ is equal to the magnitude of independent DC voltage source 1010, and $V_{cn}$ is equal to the magnitude of independent DC voltage source 1005.

Figure 10E:
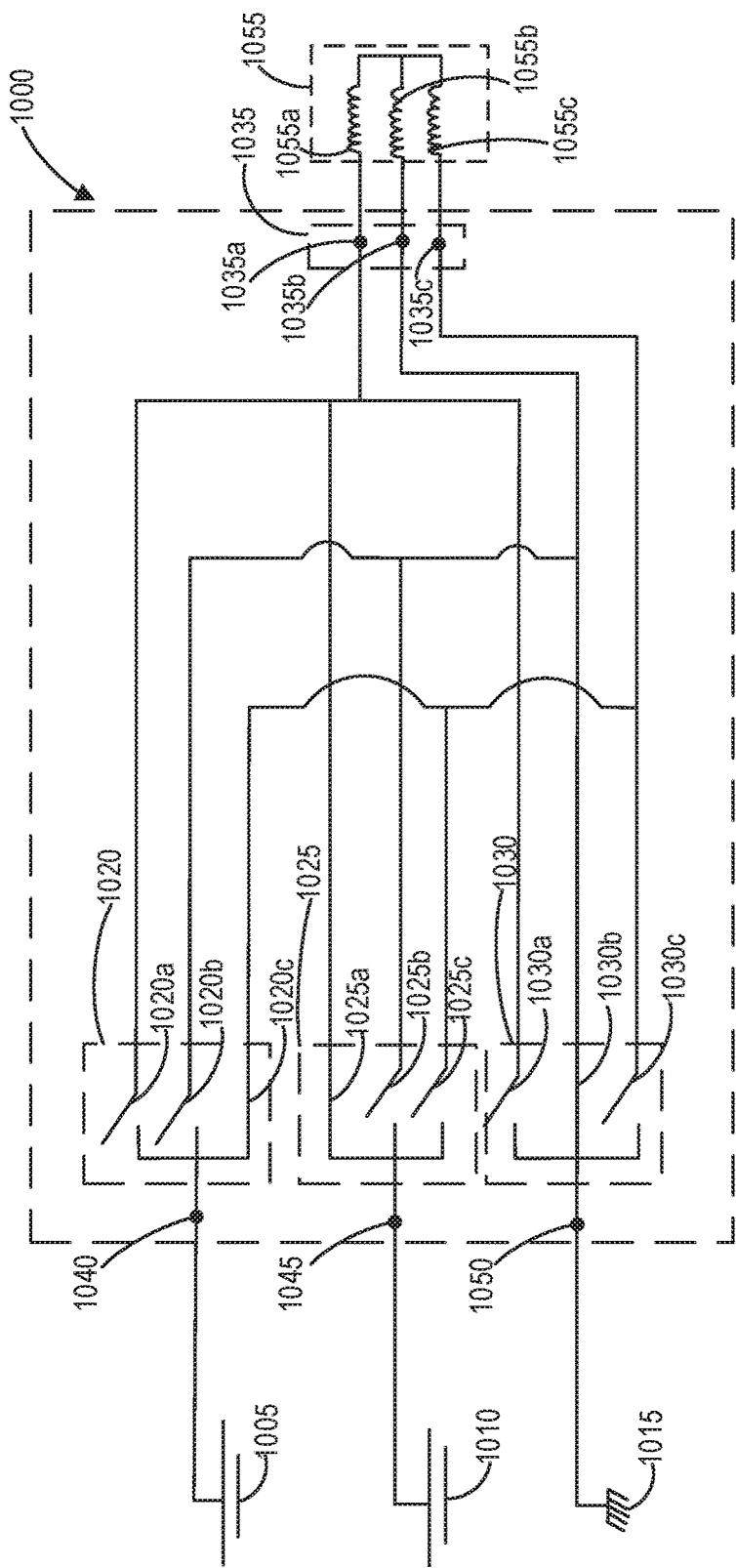
FIG. 10E illustrates a power converter operating in a third mode according to a fifth example embodiment.
Figure 10E:
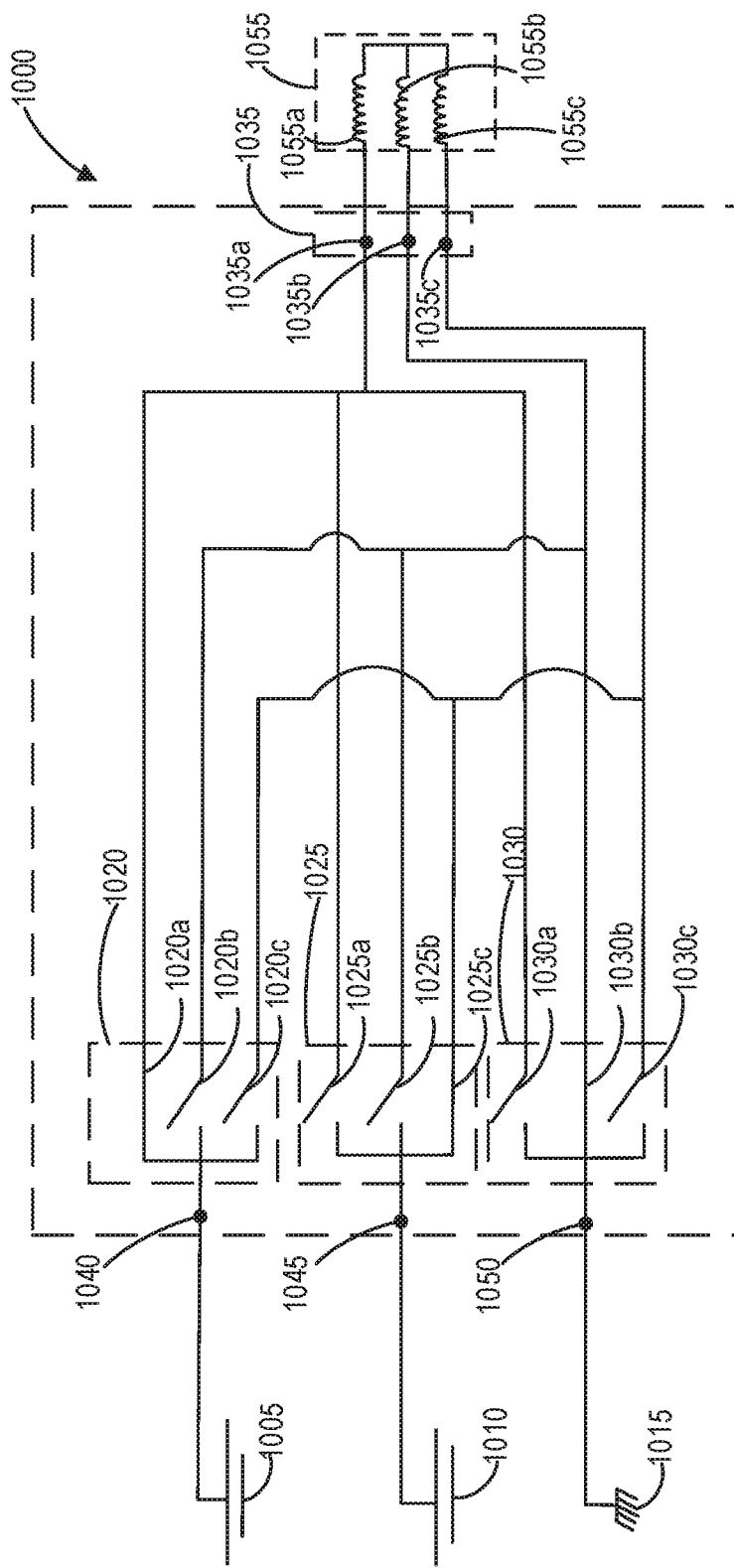

Reference is now made to FIG. 10E, which illustrates an example embodiment of power converter 1000 with a different bidirectional switch configuration to produce a different power output signal at AC terminal nodes and corresponding AC load nodes.

In this embodiment, bidirectional switches 1020c, 1025a, and 1030b are closed, and bidirectional switches 1020a, 1020b, 1025b, 1025c, 1030a, and 1030b are open. The power output signal generated at AC terminal nodes and the corresponding AC load nodes are as follows: $V_{an}$ is equal to the magnitude of independent DC voltage source 1010, $V_{bn}$ is equal to zero, and $V_{cn}$ is equal the magnitude of independent DC voltage source 1005

Reference is now made to FIG. 10F, which illustrates an example embodiment of power converter 1000 with a different bidirectional switch configuration to produce a different power output signal at AC terminal nodes and corresponding AC load nodes.

In this embodiment, bidirectional switches 1020a, 1025c, and 1030b are closed, and bidirectional switches 1020b, 1020c, 1025a, 1025b, 1030a, and 1030c are open. The power output signal generated at AC terminal nodes and the corresponding AC load nodes are as follows: $V_{an}$ is equal to the magnitude of independent DC voltage source 1005, $V_{bn}$ is equal to zero, and $V_{cn}$ is equal to the magnitude of independent DC voltage source 1010.

Figure 10G:
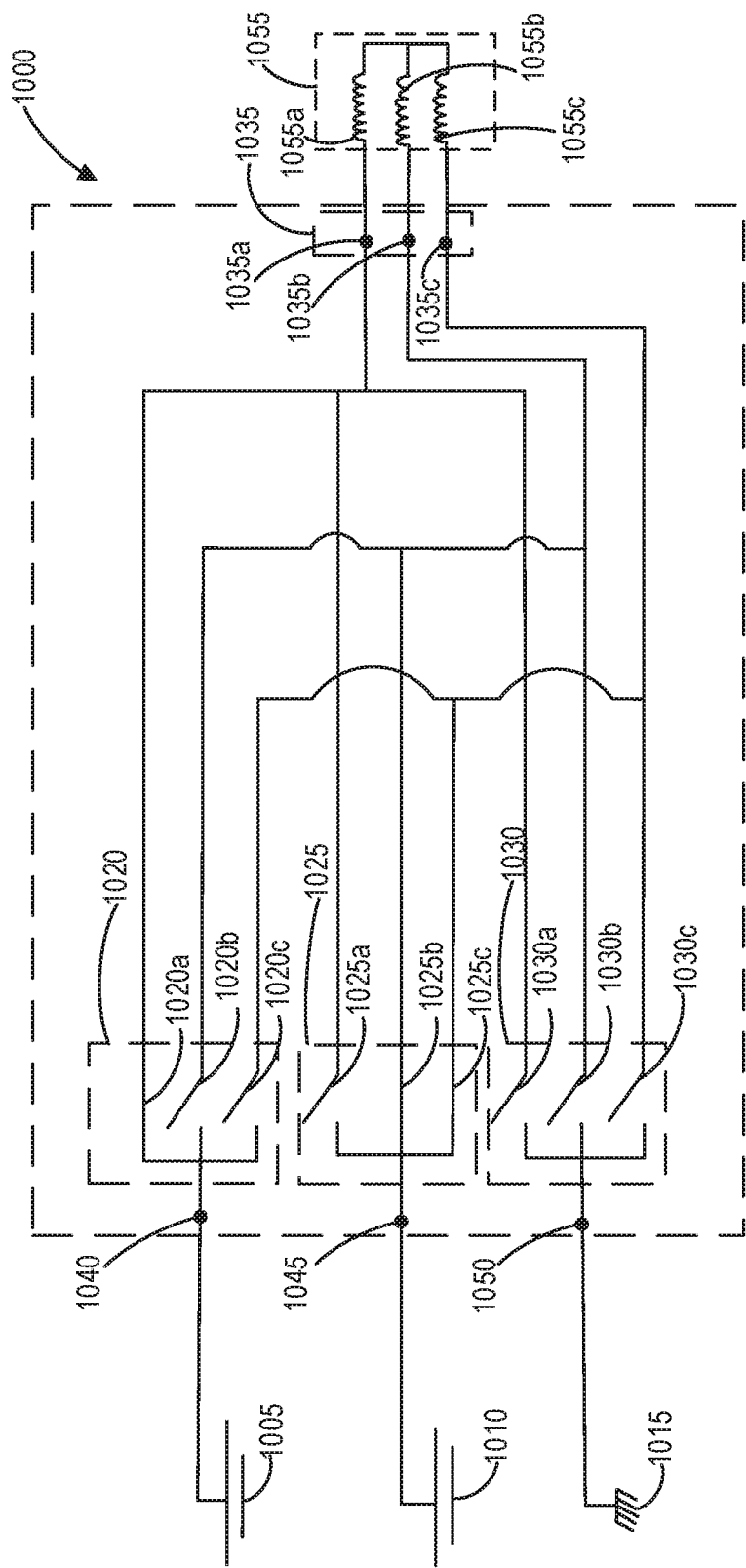
FIG. 10G illustrates a power converter operating in a third mode according to a seventh example embodiment.

Reference is now made to FIG. 10G, which illustrates an example embodiment of power converter 1000 with a different bidirectional switch configuration to produce a different power output signal at AC terminal nodes and corresponding AC load nodes.

In this embodiment, bidirectional switches 1020a, 1025b, and 1025c are closed, and bidirectional switches 1020b, 1020c, 1025a, 1030a, 1030b, and 1030c are open. The power output signal generated at AC terminal nodes and the corresponding AC load nodes are as follows: $V_{an}$ is equal to the magnitude of independent DC voltage source 1005, and $V_{bn}$ and $V_{cn}$ are equal to the magnitude of independent DC voltage source 1010.

Figure 10H:
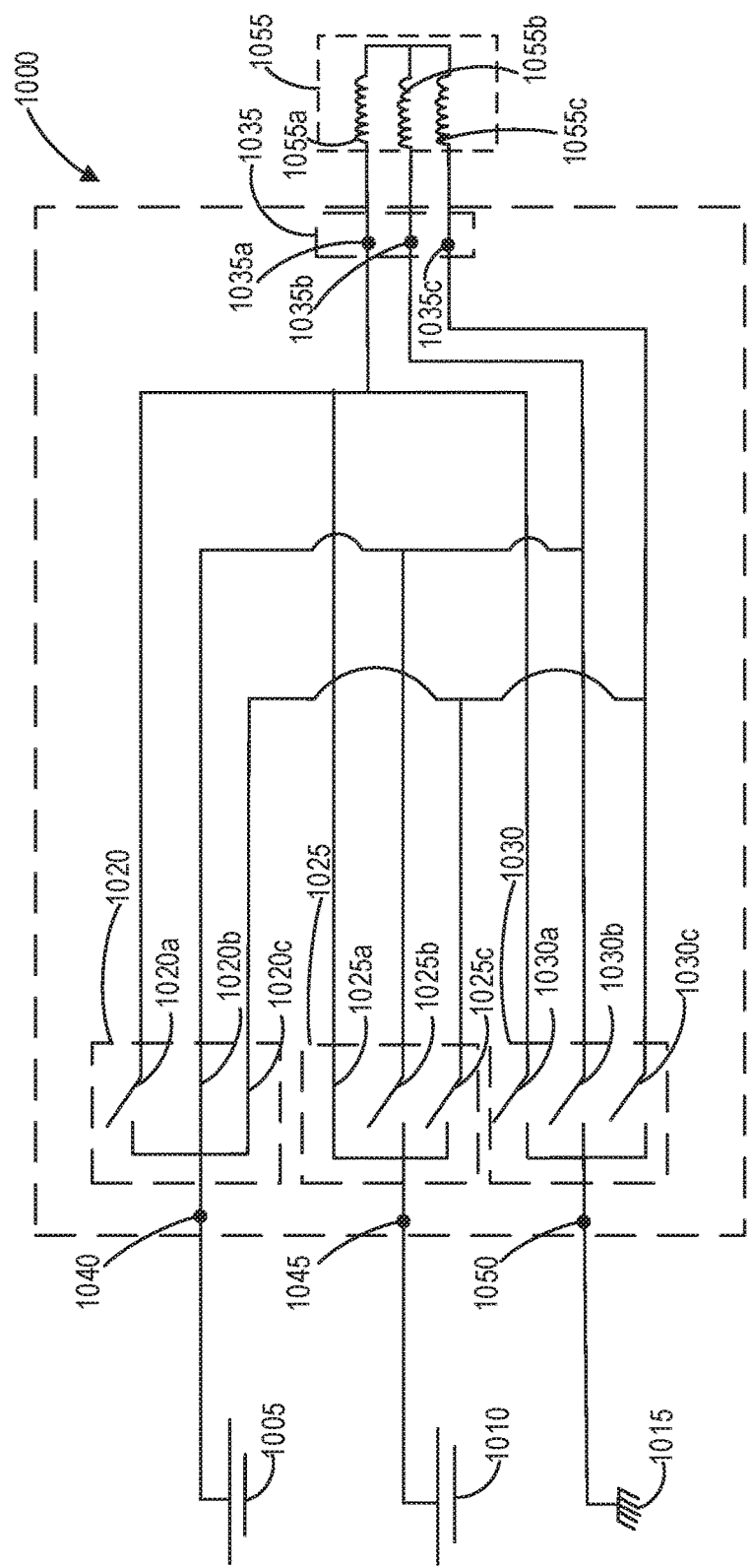
FIG. 10H illustrates a power converter operating in a third mode according to an eighth example embodiment.

Reference is now made to FIG. 10H, which illustrates an example embodiment of power converter 1000 with a different bidirectional switch configuration to produce a different power output signal at AC terminal nodes and corresponding AC load nodes.

In this embodiment, bidirectional switches 1020b, 1020c, and 1025a are closed, and bidirectional switches 1020a, 1025b, 1025c, 1030a, 1030b, and 1030c are open. The power output signal generated at AC terminal nodes and the corresponding AC load nodes are as follows: $V_{an}$ is equal to the magnitude of independent DC voltage source 1010, $V_{bn}$ and $V_{cn}$ are equal to the magnitude of independent DC voltage source 1005.

Figure 10I:
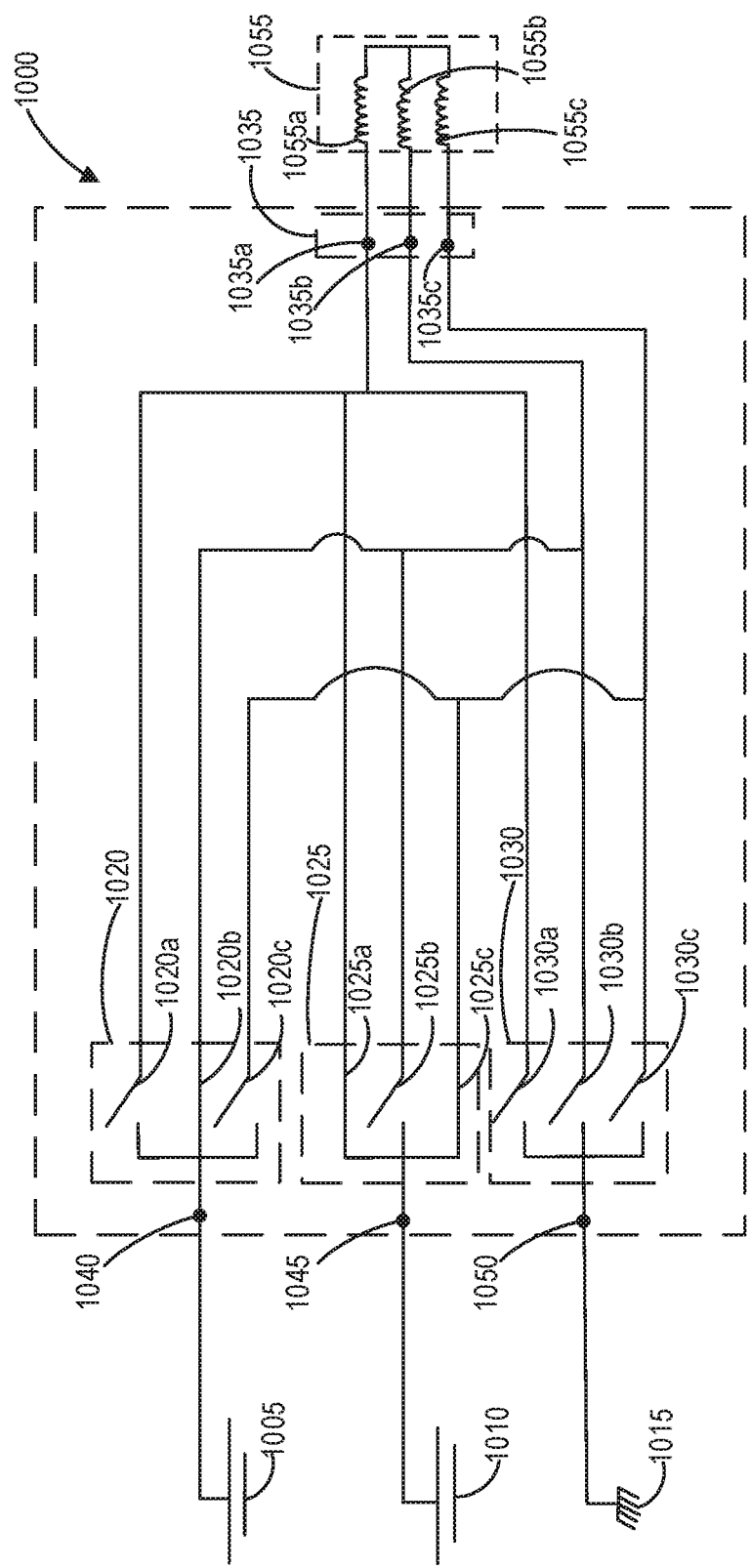
FIG. 10I illustrates a power converter operating in a third mode according to a ninth example embodiment.

Reference is now made to FIG. 10I, which illustrates an example embodiment of power converter 1000 with a different bidirectional switch configuration to produce a different power output signal at AC terminal nodes and corresponding AC load nodes.

In this embodiment, bidirectional switches 1020b, 1025a, and 1025c are closed, and bidirectional switches 1020a, 1020c, 1025b, 1030a, 1030b, and 1030c are open. The power output signal generated at AC terminal nodes and the corresponding AC load nodes are as follows: $V_{an}$ and $V_{cn}$ are equal to the magnitude of independent DC voltage source 1010, $V_{bn}$ is equal to the magnitude of independent DC voltage source 1005.

Figure 10J:
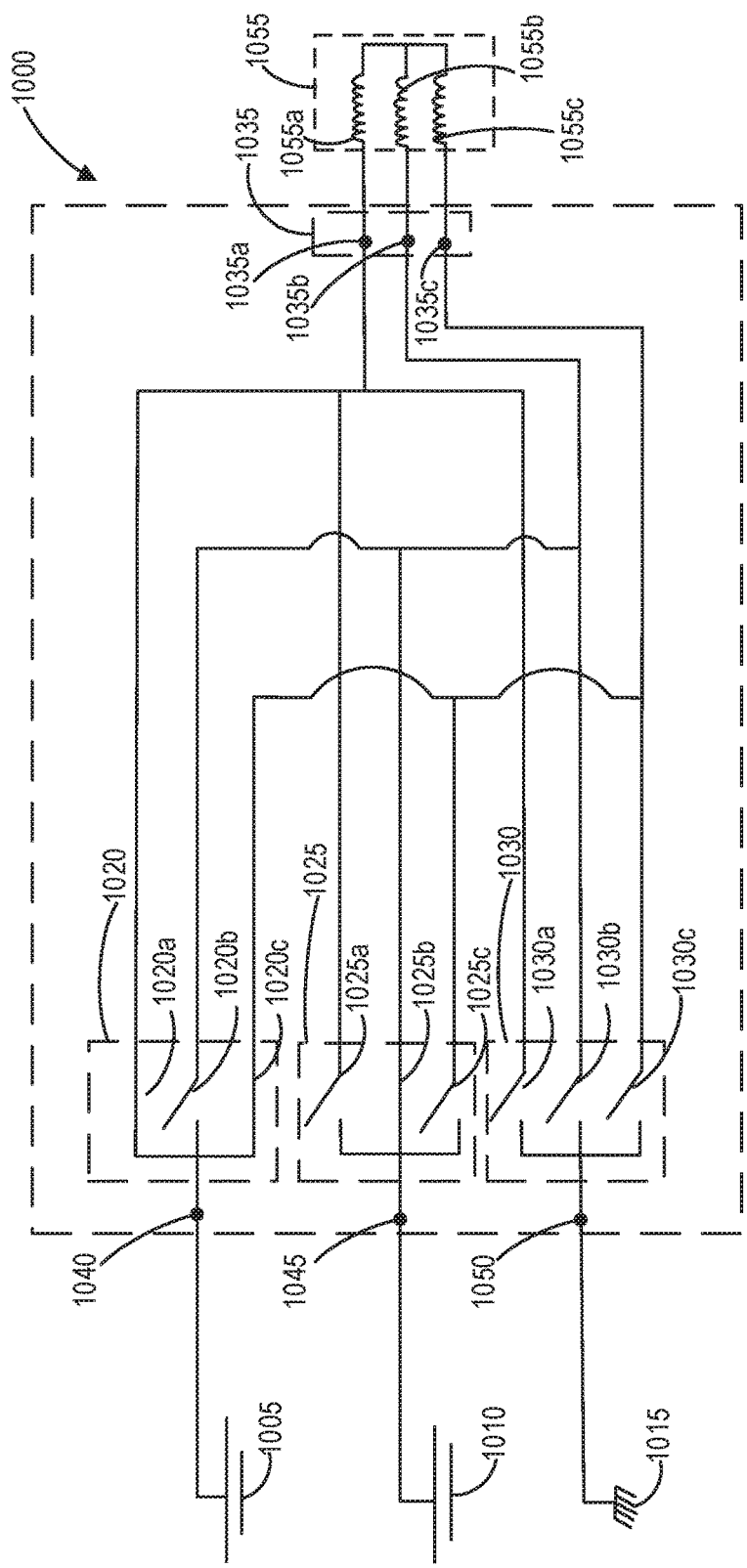
FIG. 10J illustrates a power converter operating in a third mode according to a tenth example embodiment.

Reference is now made to FIG. 10J, which illustrates an example embodiment of power converter 1000 with a different bidirectional switch configuration to produce a different power output signal at AC terminal nodes and corresponding AC load nodes.

In this embodiment, bidirectional switches 1020a, 1020c, and 1025b are closed, and bidirectional switches 1020b, 1025a, 1025c, 1030a, 1030b, and 1030c are open. The power output signal generated at AC terminal nodes and the corresponding AC load nodes are as follows: $V_{an}$ and $V_{cn}$ are equal to the magnitude of independent DC voltage source 1005, and $V_{cn}$ is equal to the magnitude of independent DC voltage source 1010.

Figure 10K:
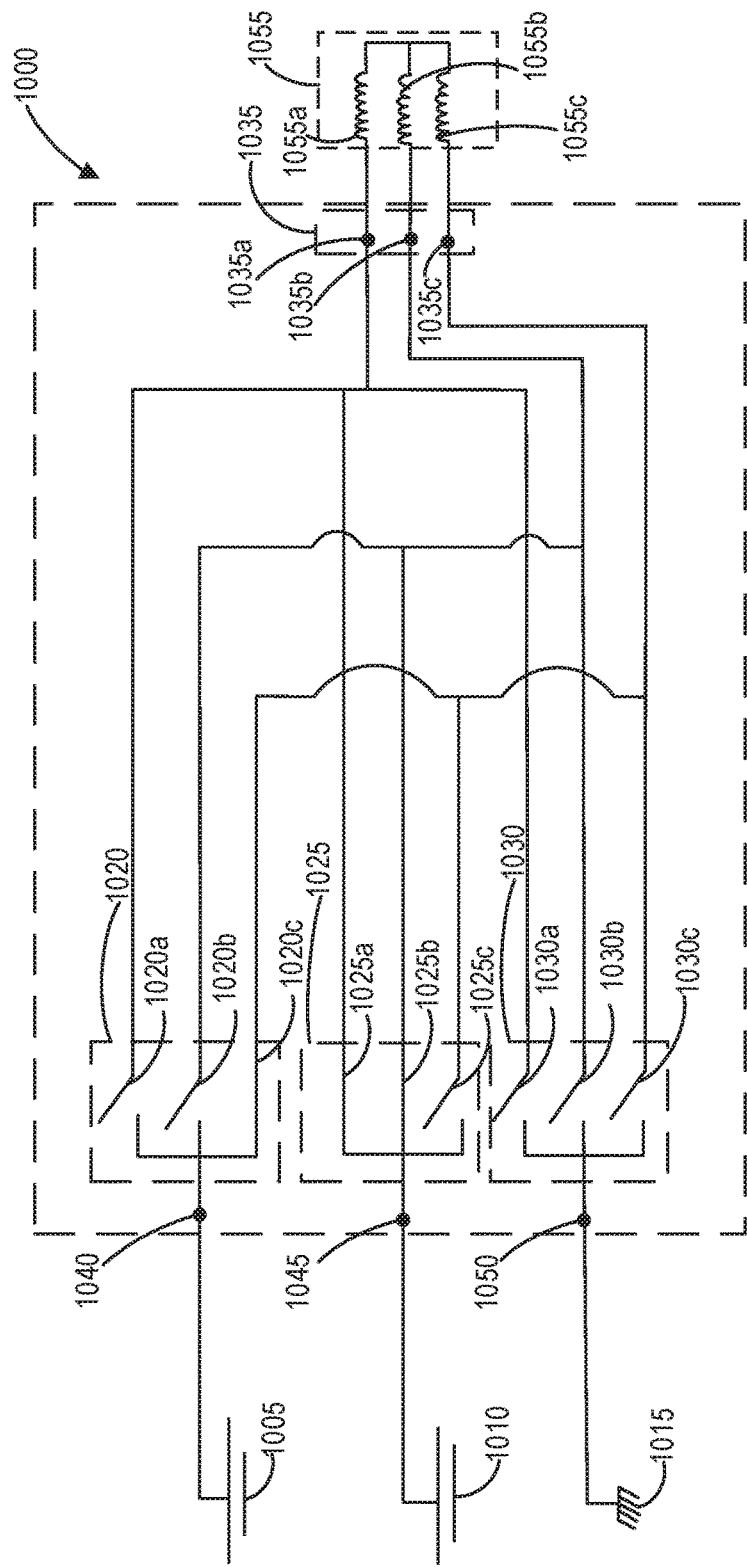
FIG. 10K illustrates a power converter operating in a third mode according to an eleventh example embodiment.

Reference is now made to FIG. 10K, which illustrates an example embodiment of power converter 1000 with a different bidirectional switch configuration to produce a different power output signal at AC terminal nodes and corresponding AC load nodes.

In this embodiment, bidirectional switches 1020c, 1025a, and 1025b are closed, and bidirectional switches 1020a, 1020b, 1025c, 1030a, 1030b, and 1030c are open. The power output signal generated at AC terminal nodes and the corresponding AC load nodes are as follows: $V_{an}$ and $V_{bn}$ are equal to the magnitude of independent DC voltage source 1010, and $V_{cn}$ is equal to the magnitude of independent DC voltage source 1005.

Figure 10L:
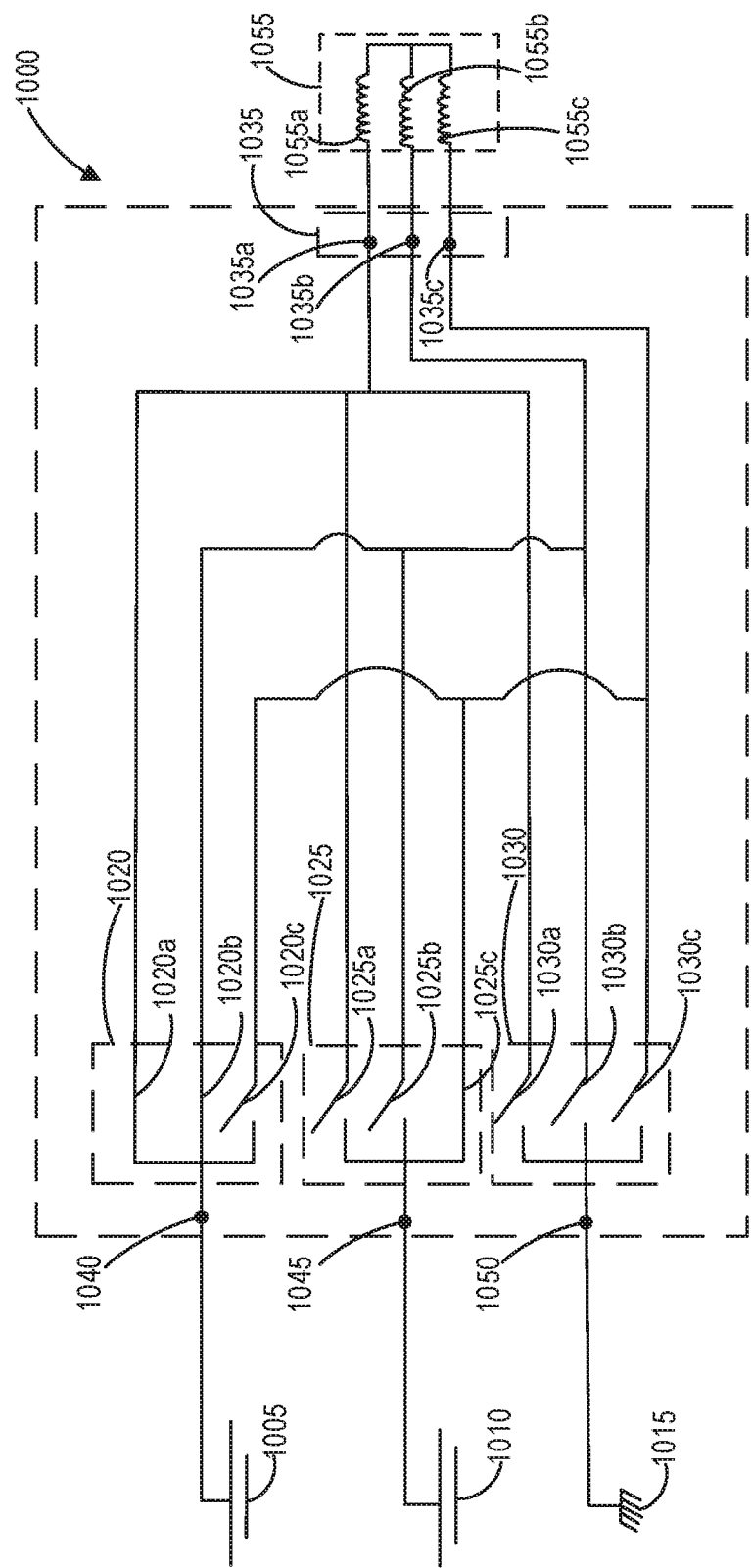
FIG. 10L illustrates a power converter operating in a third mode according to a twelfth example embodiment.

Reference is now made to FIG. 10L, which illustrates an example embodiment of power converter 1000 with a different bidirectional switch configuration to produce a different power output signal at AC terminal nodes and corresponding AC load nodes.

In this embodiment, bidirectional switches 1020a, 1020b, and 1025c are closed, and bidirectional switches 1020c, 1025a, 1025b, 1030a, 1030b, and 1030c are open. The power output signal generated at AC terminal nodes and the corresponding AC load nodes are as follows: $V_{an}$ and $V_{bn}$ are equal to the magnitude of independent DC voltage source 1005, and $V_{cn}$ is equal to the magnitude of independent DC voltage source 1010.

Figure 10M:
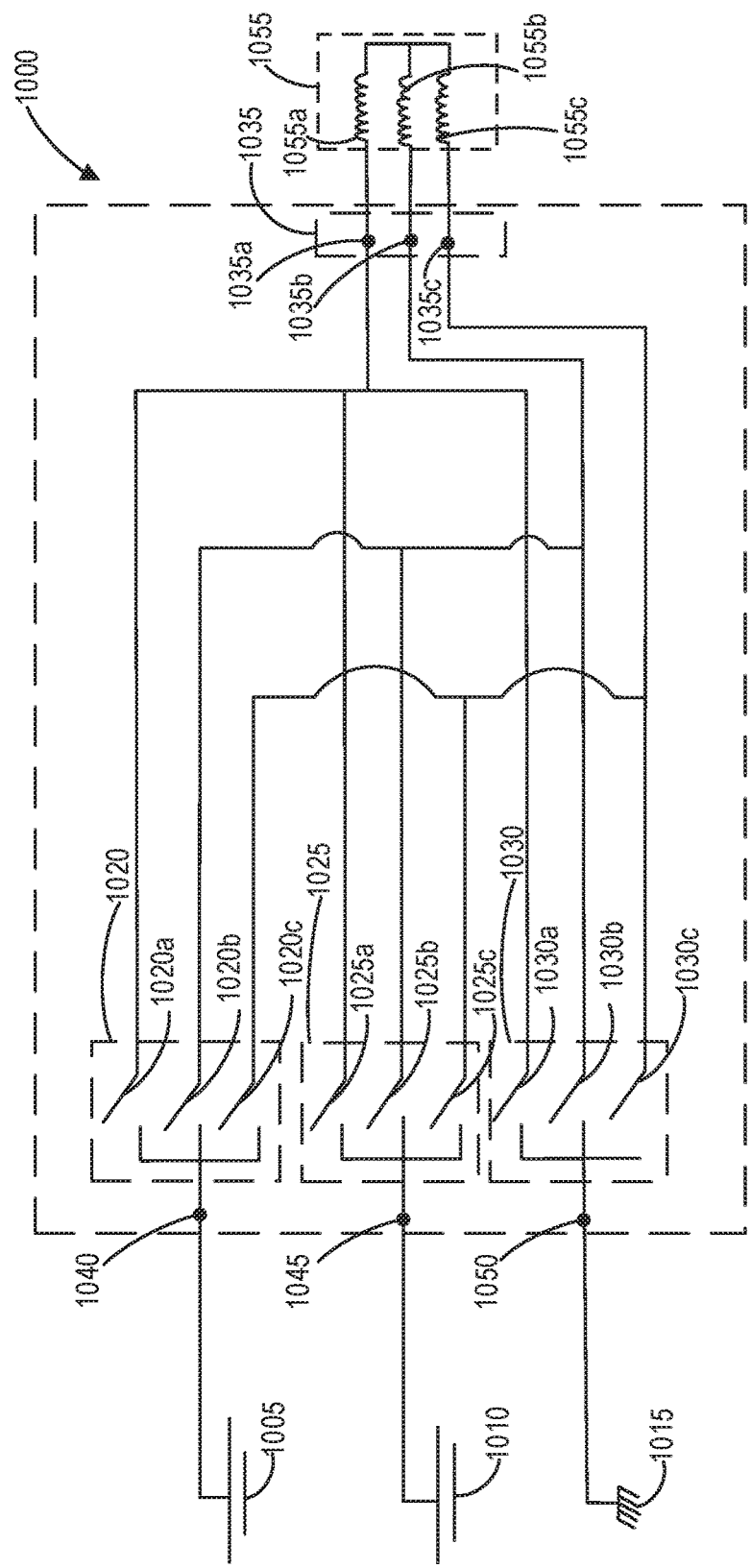
FIG. 10M illustrates a power converter according to a thirteenth example embodiment.

Now referring to FIG. 10M, which illustrates power converter 1000 with all bidirectional switches in an open position.

Now referring to FIG. 10N, which illustrates various bidirectional switch configurations of power converter 1000 of FIG. 10M operating in a first mode. The line-to-line power output signals, $V_{ab}$, $V_{bc}$, and $V_{ca}$, correspond to the voltage potential between AC terminal nodes 1035a and 1035b, 1035b and 1035c, and 1035c and 1035a, respectively. The output power signal between the AC terminal nodes and between the corresponding AC load nodes, 1055a-1055b, 1055b-1055c, 1055c-1055a, ranges between the magnitude of independent DC voltage source 1005 in positive and negative polarity.

Now referring to FIG. 10O, which illustrates various bidirectional switch configurations of power converter 1000 of FIG. 10M operating in a second mode. The line-to-line power output signals $V_{ab}$, $V_{bc}$, and $V_{ca}$, generated between AC terminal nodes and corresponding AC load nodes ranges between the magnitude of independent DC voltage source 1010 in positive and negative polarity.

Now referring to FIG. 10P, which illustrates various bidirectional switch configurations of power converter 1000 of FIG. 10M operating in a third mode. The line-to-line power output signals $V_{ab}$, $V_{bc}$, and $V_{ca}$, generated between AC terminal nodes and corresponding AC load nodes ranges between the magnitudes of independent DC voltage sources 1005 and 1010 in positive and negative polarity, as well as the corresponding difference between both independent DC voltage sources 1005 and 1010. In this example embodiment DC terminal 1050 is coupled to ground 1015. In other embodiments terminal 1050 may be a non-zero voltage. For example, terminal 1050 may be coupled to a DC voltage source. In such embodiments, the other voltages in power converter 1000 will be referenced to such non-zero voltage.

Figure 11A:
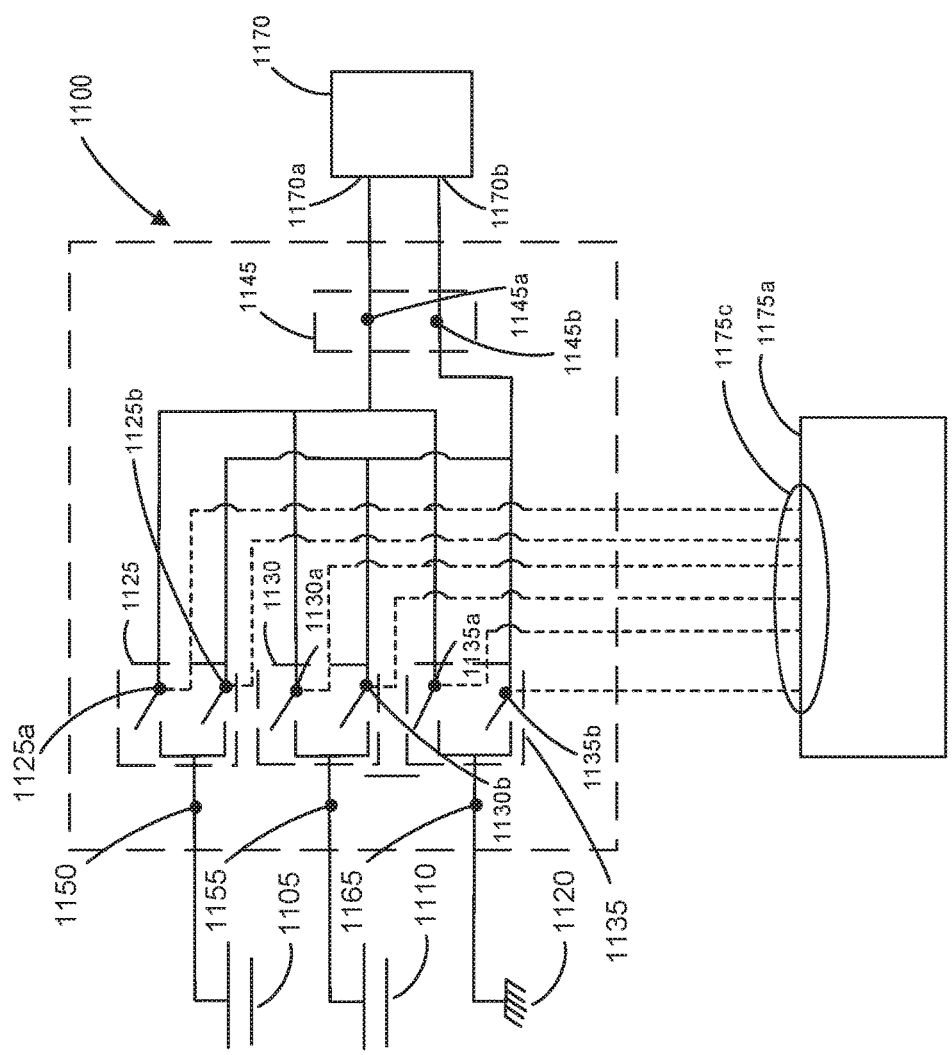
FIG. 11A illustrates a power converter with an embedded computing platform for controlling bidirectional switch states according to an example embodiment.

Now referring to FIG. 11A, which illustrates an example embodiment of power converter 1100 operating as an inverter for converting power from two independent DC voltage sources 1105 and 1110, to a single phase AC load 1170. Power converter 1100 comprises three DC terminals 1150, 1155, and 1165, three converter cells 1125, 1130, and 1135, and AC terminal 1145. DC terminals 1150 and 1155 are coupled to independent DC voltage sources 1105 and 1110, respectively, and DC terminal 1165 is coupled to ground 1120. Although this example embodiment illustrates a single phase AC load, power converter 1100 can operate as an inverter for converting power between independent DC voltage sources and a three phase AC load by using converter cells that comprise three bidirectional switches per cell.

AC terminal 1145 is coupled to single phase AC load 1170. AC terminal 1145 comprises two AC terminal nodes 1145a and 1145b. AC load 1170 comprises a positive node 1170a, and a negative node 1170b. AC terminal node 1145a is coupled to the positive node 1170a of single phase AC load 1170, and 1145b, is coupled to the negative node 1170b of single phase AC load 1170.

Converter cells 1125, 1130, and 1135, each comprises two bidirectional switches 1125a, 1125b, 1130a, 1130b, 1135a, and 1135b, and each converter cell is coupled between a corresponding DC terminal, 1150, 1155, 1165, respectively, and the AC terminal 1145. Specifically, bidirectional switches 1125a, 1130a, and 1135a are coupled to AC terminal node 1145a, and bidirectional switches 1125b, 1130b, and 1135b are coupled to AC terminal node 1145b.

The switching states of each bidirectional switch in converter cells 1125, 1130, and 1135, are controlled by an embedded computing platform 1175a, which may include a digital signal processor board, microcontroller, or field programmable gate array. Embedded computing platform 1175a comprises several outputs 1175c, which are coupled to bidirectional switches 1125a, 1125b, 1130a, 1130b, 1135a, and 1135b, and controls the switching state of each bidirectional switch as either open or closed.

Figure 11B:
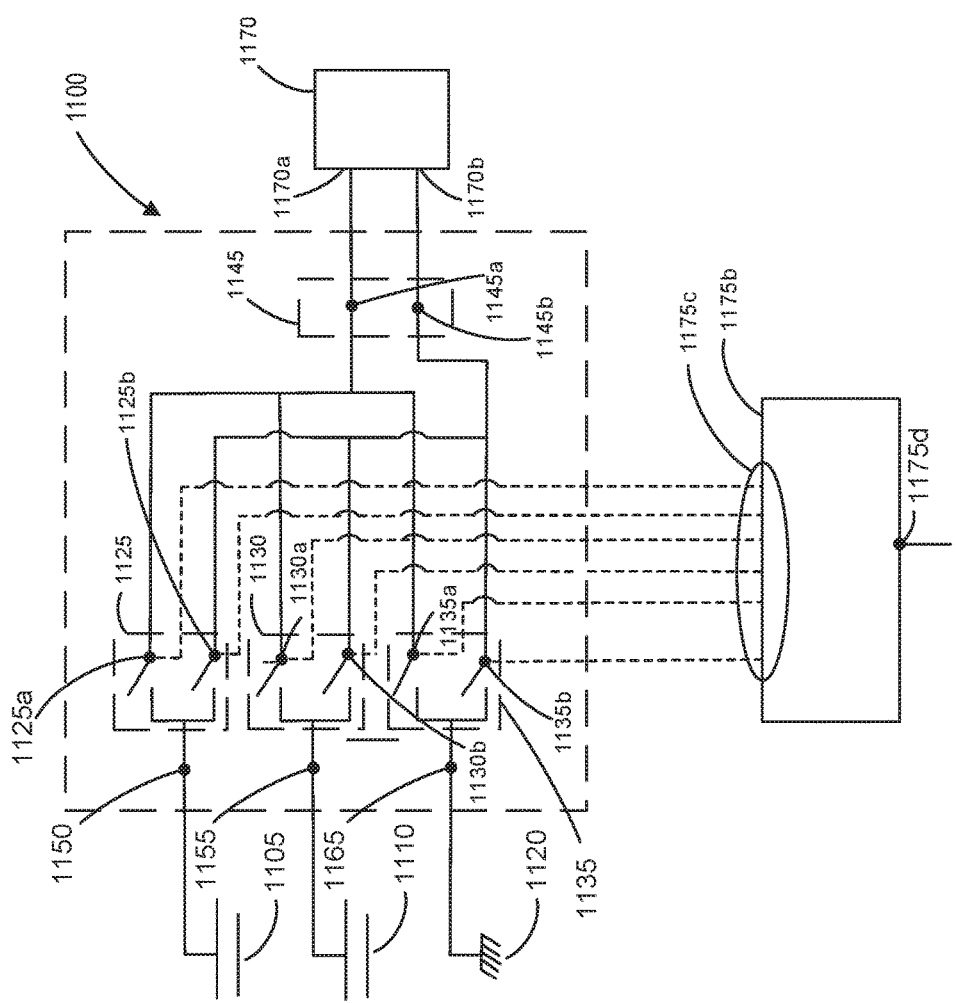
FIG. 11B illustrates a power converter with an embedded computing platform for controlling bidirectional switch states according to another example embodiment.

Now referring to FIG. 11B, which illustrates an example embodiment of power converter 1100 operating as an inverter for converting power from two independent DC voltage sources 1105 and 1110, to a single phase AC load 1170, where the switching states of each bidirectional switch in converter cells 1125, 1130, and 1135 are controlled by embedded computing platform 1175b. Embedded computing platform 1175b may include a digital signal processor board, microcontroller, or field programmable gate array. Embedded computing platform 1175b comprises an input 1175d, and several outputs 1175c. Outputs 1175c are coupled to bidirectional switches 1125a, 1125b, 1130a, 1130b, 1135a, and 1135b, in order to vary the switching state as either open or closed. Embedded computing platform 1175b may receive instructions on varying the switching states from an external computer (not shown) through input 1175d.

Figure 12A:
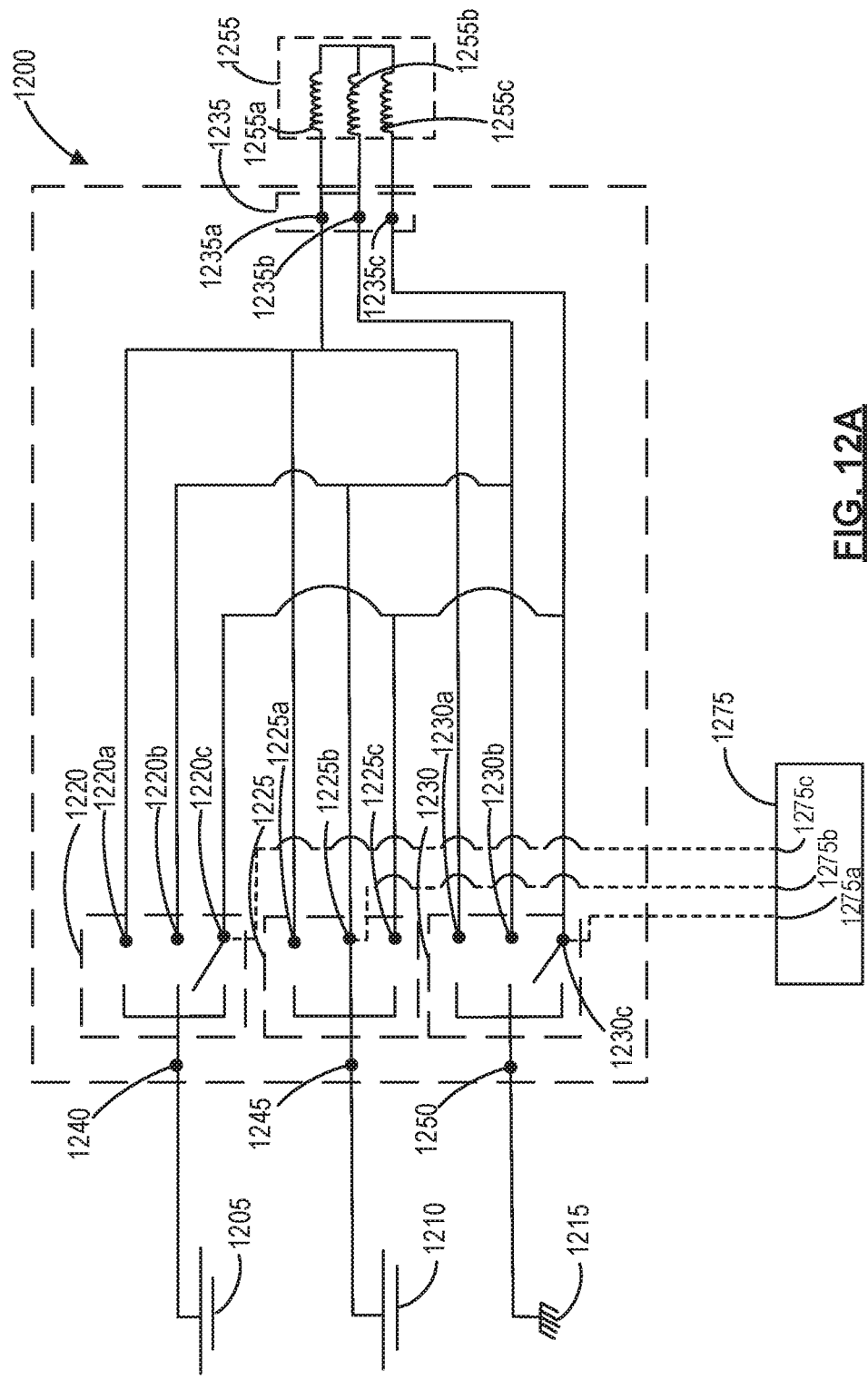
FIG. 12A illustrates a power converter operating as a DC to DC converter according to an example embodiment.

Reference is now made to FIG. 12A, which illustrates an example embodiment of power converter 1200 operating as a DC to DC converter for converting power from one independent DC voltage source 1210 to a second independent DC voltage source 1205, when a three phase AC load 1255 is stationary (i.e. not drawing power or supplying power). The AC load can be the windings of an AC electric machine.

Power converter 1200 comprises three DC terminals 1240, 1245, and 1250, three converter cells 1220, 1225, and 1230, and an AC terminal 1235. Each converter cell comprises three bidirectional switches 1220a (not shown), 1220b (not shown), 1220c, 1225a (not shown), 1225b, 1225c (not shown), 1230a (not shown), 1230b (not shown), and 1230c. The AC terminal 1235 comprises three AC terminal nodes, 1235a, 1235b, and 1235c. AC load 1255 comprises three phase nodes, 1255a, 1255b, and 1255c which represent $V_{an}$, $V_{bn}$, and $V_{cn}$, respectively. AC terminal nodes 1235a, 1235b, and 1235c are each coupled to corresponding AC load nodes 1255a, 1255b, and 1255c, respectively.

Converter cells 1220, 1225, and 1230, are coupled between DC terminals 1240, 1245, and 1250, respectively, and AC terminal 1235. DC terminals 1240 is coupled to a first independent DC voltage source 1205, DC terminal 1245 is coupled to a second independent DC voltage source 1210, and DC terminal 1250 is coupled to ground 1215.

The switching states of each bidirectional switch in converter cells 1225, 1230, and 1235, are controlled by an embedded computing platform 1275, which may include a digital signal processor board, microcontroller, or field programmable gate array. Embedded computing platform 1275 comprises outputs 1275a, 1275b, and 1275c, which are coupled to bidirectional switches 1230c, 1225b, 1220c, respectively, and controls the switching state of each bidirectional switch as either open or closed.

In this embodiment, bidirectional switch 1225b is closed, and bidirectional switches 1220c and 1230c are active, which means the switch position is varied by the embedded computing platform 1275, bidirectional switches 1220a, 1220b, 1230a, are 1230b are not active, and bidirectional switches 1225a, 1225c are open. When bidirectional switches 1225b and 1220c are both closed, independent DC voltage source 1210 can supply a DC power signal to charge independent DC voltage source 1205.

Reference is now made to FIG. 12B, which illustrates various example embodiments of different bidirectional switch positions of power converter 1200 operating as a DC to DC converter.

Figure 13:
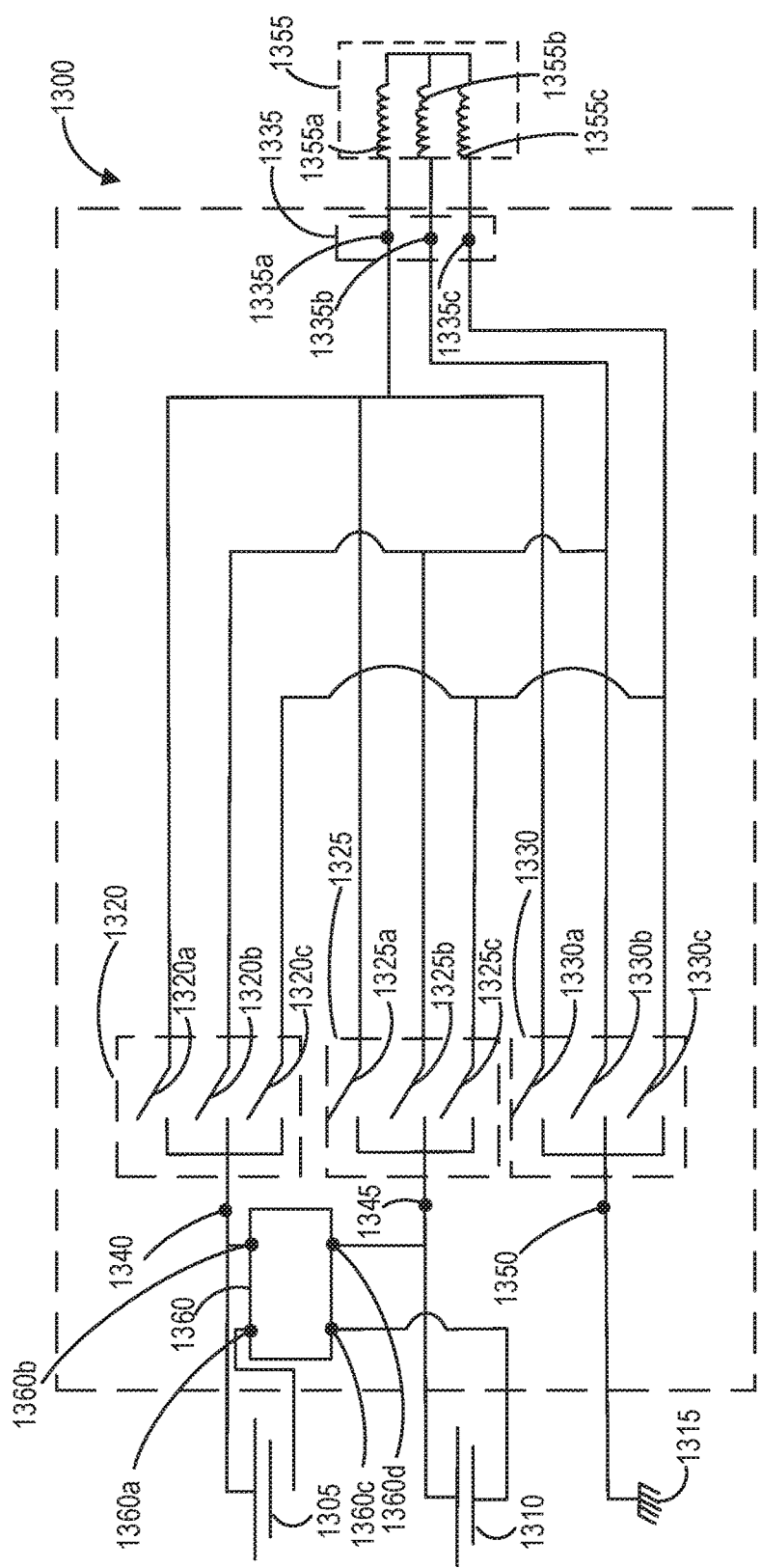
FIG. 13 illustrates a power converter operating as an inverter according to an example embodiment.

Reference is now made to FIG. 13, which illustrates an example embodiment power converter 1300 operating as an inverter for converting power from two independent DC voltage sources 1305 and 1310 to a three phase AC load 1355, wherein a DC to DC converter 1360 is coupled between the independent DC voltage sources 1305 and 1310 to allow one independent DC voltage source to supply power to a second independent DC voltage source. Power converter 1300 comprises three DC terminals 1340, 1345, and 1350, three converter cells 1320, 1325, and 1330, and an AC terminal 1335. Each converter cell comprises three bidirectional switches 1320a, 1320b, 1320c, 1325a, 1325b, 1325c, 1330a, 1330b, and 1330c. The AC terminal 1335 comprises three AC terminal nodes, 1335a, 1335b, and 1335c. AC load 1355 comprises three phase nodes, 1355a, 1355b, and 1355c which represent $V_{an}$, $V_{bn}$, and $V_{cn}$, respectively. AC terminal nodes 1335a, 1335b, and 1335c are each coupled to corresponding AC load nodes 1355a, 1355b, and 1355c.

Converter cells 1320, 1325, and 1330, are coupled between DC terminals 1340, 1345, and 1350, respectively, and AC terminal 1335. DC terminals 1340 is coupled to a first independent DC voltage source 1305, DC terminal 1345 is coupled to a second independent DC voltage source 1310, and DC terminal 1350 is coupled to ground 1015.

Converter cells 1320, 1325, and 1330, each comprise three bidirectional switches 1320a, 1320b, 1320c, 1325a, 1325b, 1325c, 1330a, 1330b, 1330c, wherein bidirectional switches 1320a, 1325a, 1330a are coupled to AC terminal node 1335a, bidirectional switches 1320b, 1325b, 1330b are coupled to AC terminal 1335b, and bidirectional switches 1320c, 1325c, and 1330c are coupled to AC terminal 1335c.

The switching states of each bidirectional switch in converter cells 1320, 1325, and 1330, are controlled by an embedded computing platform (not shown), which may include a digital signal processor board, microcontroller, or field programmable gate array.

DC to DC converter 1360 can be a unidirectional or bidirectional switching power converter and may have electrical isolation. DC to DC converter 1360 comprises two positive terminals, 1360b and 1360d, and two negative terminals 1360a and 1360c. Each positive and negative terminal of the DC to DC converter is coupled to the corresponding polarity of the independent DC voltage sources.

In this embodiment, power converter 1300 can produce a power output signal at the AC terminals and using a DC to DC converter 1360 to permit one independent DC voltage source to supply a DC power signal to a second independent DC voltage source.

The present invention has been described here by way of example only. Various modifications and variations may be made to these exemplary embodiments without departing from the spirit and scope of the invention, which is limited only by the appended claims.

We claim:

1. A power converter for providing a power output signal, the power converter comprising:
    a plurality of direct current (DC) terminals;
    an alternating current (AC) terminal comprising three AC terminal nodes;
    a plurality of converter cells, each converter cell corresponding to a unique DC terminal of the plurality of DC terminals and each converter cell being uniquely coupled between the corresponding DC terminal and the AC terminal, wherein each converter cell includes a plurality of switches for selectively coupling the corresponding DC terminal to one of the three AC terminal nodes, and wherein one DC terminal of the plurality of DC terminals is connected to ground and wherein the corresponding converter cell is configurable to selectively couple at least one of the three AC terminal nodes to ground; and
    a controller for operating the converter cells to selectively couple the plurality of DC terminals to the AC terminal.

2. The power converter of claim 1, further comprising a plurality of DC sources, wherein each DC source is connected to a unique DC terminal, wherein the three AC terminal nodes are coupled to a three phase AC load, and wherein the controller selectively operates the plurality of converter cells to provide a power output signal at the three AC terminal nodes, wherein each converter cell comprises three bidirectional switches, and wherein the plurality of converter cells are configured to convert one or more DC signals from the plurality of DC sources to a three phase AC signal to provide to the three phase AC load.

3. The power converter of claim 2, wherein each DC source has a different voltage magnitude than the other DC sources.

4. The power converter of claim 1, wherein at least one DC terminal of the plurality of DC terminals is connected to a DC load, wherein the three AC terminal nodes are coupled to a three phase AC source, and wherein the controller selectively operates the converter cells to provide a power output signal at the corresponding DC terminal node, wherein each converter cell comprises three bidirectional switches, and wherein the plurality of converter cells are configured to convert an AC signal to a DC signal.

5. The power converter of claim 1 further comprising:
    a plurality of DC sources, each DC source being coupled to a corresponding DC terminal; and
    for at least one DC source:
        a corresponding secondary DC source; and
        a DC backup switch coupled between the corresponding DC terminal and the corresponding secondary DC source, and
    wherein the controller selectively operates the DC backup switch for selectively coupling the corresponding secondary DC source to the corresponding converter cell.

6. The power converter of claim 5, wherein the DC backup switch comprises a bidirectional switch.

7. The power converter of claim 2, wherein a DC to DC converter is coupled between the at least two DC sources.

8. The power converter of claim 3, wherein a DC to DC converter is coupled between the at least two DC sources.

9. The power converter of claim 2, wherein one of the at least two DC sources supplies a DC power signal to the other DC source.

10. The power converter of claim 3, wherein one of the at least two DC sources supplies a DC power signal to the other DC source.

11. The power converter of claim 2, wherein each DC source has the same voltage magnitude.

12. The power converter of claim 3, wherein the power output signal comprises a multilevel power output signal.

13. The power converter of claim 1, wherein the plurality of switches comprises a switch formed with a first insulated-gate biopolar transistor (IGBT) and a second IGBT, the first IGBT being connected to the second IGBT to form a common emitter connection.

14. The power converter of claim 1, wherein at least one switch of the plurality of switches is selected from the group consisting of a single pole single throw (SPST) relay; a SPST contactor; a single pole double th row (SPDT) relay; a SPDT contactor; a switch formed with one or more metal-oxide-semiconductor field-effect transistors (MOSFETs); a switch formed a first insulated-gate biopolar tranistor (IGBT) and a second IGBT, the first IGBT being connected to the second IGBT to form a common collector connection; a switch formed with a bipolar junction transistor (BJT) with a diode connected in parallel; a switch formed of an IGBT and a diode bridge; and a triac.

15. A method of converting power between a plurality of DC sources and a three-phase AC load, the method comprising:
    uniquely coupling each of the plurality of DC sources to a corresponding DC terminal;
    coupling the three-phase AC load to an AC terminal;
    connecting a plurality of converter cells between the DC terminals and the AC terminal such that each converter cell is uniquely connected between each DC terminal and the AC terminal, wherein each converter cell includes a plurality of switches;
    coupling one converter cell between a ground terminal and the AC terminal; and coupling a controller to the plurality of converter cells for controlling switching states of the corresponding converter cells to provide a power output signal at the AC terminal.

16. The method of claim 15, wherein each DC source of the plurality of DC sources has a different magnitude.

17. The method of claim 16, wherein the power output signal comprises a multilevel voltage.

18. A method of converting power between a three-phase AC source and a plurality of DC loads, the method comprising:
   coupling the three-phase AC source to an AC terminal;
   coupling each of the plurality of DC loads to a corresponding DC terminal;
   connecting a plurality of converter cells between the DC loads and the AC terminal such that each converter cell is uniquely connected between each DC terminal and the AC terminal, wherein each converter cell comprises a plurality of switches;
   coupling one converter cell between a ground terminal and the AC terminal; and
   coupling a controller to the plurality of converter cells for controlling switching states of the corresponding converter cells to provide a power output signal.

* * * * *